United States Patent
Kim et al.

(10) Patent No.: US 12,420,649 B2
(45) Date of Patent: Sep. 23, 2025

(54) POWER SUPPLY SYSTEM OF AIRCRAFT AND CONTROL METHOD THEREOF

(71) Applicants: Hyundai Motor Company, Seoul (KR); Kia Corporation, Seoul (KR)

(72) Inventors: Jong Pil Kim, Suwon-Si (KR); Hyun Ki Cho, Anyang-Si (KR); Yoon Cheol Jeon, Suwon-Si (KR); Ji Han Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/532,539

(22) Filed: Dec. 7, 2023

(65) Prior Publication Data

US 2024/0336150 A1 Oct. 10, 2024

(30) Foreign Application Priority Data

Apr. 6, 2023 (KR) ........................ 10-2023-0045434

(51) Int. Cl.
*B60L 50/75* (2019.01)
*B60L 3/00* (2019.01)
(Continued)

(52) U.S. Cl.
CPC ............. *B60L 50/75* (2019.02); *B60L 3/0046* (2013.01); *B60L 58/40* (2019.02); *B64D 27/355* (2024.01);
(Continued)

(58) Field of Classification Search
None
See application file for complete search history.

(56) References Cited

U.S. PATENT DOCUMENTS 8,344,544 B2  1/2013  Rozman et al.
10,727,554 B2 7/2020  Oya
(Continued)

FOREIGN PATENT DOCUMENTS

AU    2019279949 A1   9/2020
FR    3065840 A1     11/2018
(Continued)

OTHER PUBLICATIONS

Jul. 4, 2024—(EP) European Search Report—App No. 23213194.6.
(Continued)

*Primary Examiner* — Rexford N Barnie
*Assistant Examiner* — Aqeel H Bukhari
(74) *Attorney, Agent, or Firm* — Banner & Witcoff, Ltd.

(57) ABSTRACT

A power supply system of an aircraft includes a fuel cell that generates electrical energy, a converter device including a mode switch device that supplies power to a first motor device through a first output terminal and switches a connection between an output node of the fuel cell and the first output terminal, a first battery device that supplies a voltage from a first battery to a second motor device through a second output terminal and connects the second output terminal with the first output terminal under control of the mode switch device, and a processor that controls the mode switch device to enter an emergency mode when detecting an error in the converter device or the first battery device and connects the first output terminal with the second output terminal.

19 Claims, 25 Drawing Sheets

(51) Int. Cl.
  *B60L 58/40* (2019.01)
  *B64D 27/355* (2024.01)
  *B64D 27/357* (2024.01)
  *H01M 16/00* (2006.01)
  *H02J 4/00* (2006.01)
  *H02J 7/00* (2006.01)
  *H02P 5/74* (2006.01)
  *B64D 41/00* (2006.01)

(52) U.S. Cl.
  CPC ........ B64D 27/357 (2024.01); H01M 16/006 (2013.01); H02J 4/00 (2013.01); H02J 7/0063 (2013.01); H02P 5/74 (2013.01); *B60L 2200/10* (2013.01); *B64D 2041/005* (2013.01); *B64D 2221/00* (2013.01); *H01M 2220/20* (2013.01); *H01M 2250/20* (2013.01); *H01M 2250/402* (2013.01); *H02J 2207/20* (2020.01); *H02J 2300/30* (2020.01)

(56) References Cited

U.S. PATENT DOCUMENTS

| | | |
|---|---|---|
| 11,121,565 B2 | 9/2021 | Dunn et al. |
| 11,462,918 B2 | 10/2022 | Crouse, Jr. |
| 2003/0230671 A1 | 12/2003 | Dunn |
| 2008/0144342 A1 | 6/2008 | Du et al. |
| 2012/0318914 A1 | 12/2012 | Rajashekara et al. |
| 2013/0270912 A1 | 10/2013 | Krenz |
| 2016/0264006 A1 | 9/2016 | Chou et al. |
| 2016/0297544 A1 | 10/2016 | Kim et al. |
| 2017/0207634 A1 | 7/2017 | Katano et al. |
| 2018/0141674 A1 | 5/2018 | Bailey et al. |
| 2018/0233793 A1 | 8/2018 | Oya |
| 2019/0229542 A1 | 7/2019 | Dunn et al. |
| 2019/0291599 A1 | 9/2019 | Andou et al. |
| 2019/0322376 A1 | 10/2019 | Pan et al. |
| 2020/0180774 A1 | 6/2020 | Rainville |
| 2020/0274368 A1* | 8/2020 | Crouse, Jr. ............. B64U 10/25 |
| 2021/0229822 A1 | 7/2021 | Morrison |
| 2022/0021313 A1* | 1/2022 | Kitamoto .................. H02J 7/34 |
| 2022/0388628 A1 | 12/2022 | Regnier et al. |
| 2022/0402621 A1 | 12/2022 | McLean |
| 2024/0157808 A1 | 5/2024 | Kim et al. |

FOREIGN PATENT DOCUMENTS

| | | |
|---|---|---|
| JP | 2018-133247 A | 8/2018 |
| JP | 2019-110654 A | 7/2019 |
| KR | 10-2018-0000639 A | 1/2018 |
| KR | 10-2161980 B1 | 10/2020 |
| KR | 10-2021-0062113 A | 5/2021 |
| KR | 10-2024-0070158 A | 5/2024 |

OTHER PUBLICATIONS

May 10, 2024—(EP) European Search Report—App 23209417.7.
Mar. 3, 2025—(US) Non-Final Office Action—U.S. Appl. No. 18/385,549.

* cited by examiner

POWER SUPPLY SYSTEM OF AIRCRAFT AND CONTROL METHOD THEREOF

CROSS-REFERENCE TO RELATED APPLICATION

This application claims the benefit of priority to Korean Patent Application No. 10-2023-0045434, filed in the Korean Intellectual Property Office on Apr. 6, 2023, the entire contents of which are incorporated herein by reference.

TECHNICAL FIELD

The present disclosure relates to a power supply system of an aircraft and a control method thereof, and more particularly, relates to technologies of providing power of the aircraft using eco-friendly energy.

BACKGROUND

Research has been actively conducted on aircraft for future traffic and transportation systems. An aircraft may use its motor to drive its propeller. In this case, there is a need for a power supply system called a powertrain for supplying power to the motor.

A power supply source of the power supply system may use a fuel cell or a battery. The fuel cell is advantageous for increasing a cruising distance, but is heavy. The battery has high power compared to its weight, but has a limitation to increase a cruising distance due to discharging. Thus, there is a need to develop a power supply system capable of providing more efficient power supply.

Furthermore, when a plurality of motors are driven by a plurality of power supply sources, an error and/or a failure may occur in some power supply sources. Thus, there is a need for countermeasures against the error and/or the failure in some power supply sources.

SUMMARY

The following summary presents a simplified summary of certain features. The summary is not an extensive overview and is not intended to identify key or critical elements.

An aspect of the present disclosure provides a power supply system for making the take-off of an aircraft easier while reducing a weight and a control method thereof.

Another aspect of the present disclosure provides a power supply system for further increasing a cruising distance even while increasing a weight and a control method thereof.

Furthermore, another aspect of the present disclosure provides a power supply system for responding to the case where an error and/or a failure occurs in some power supply sources and a control method thereof.

The technical problems to be solved by the present disclosure are not limited to the aforementioned problems, and any other technical problems not mentioned herein will be clearly understood from the following description by those skilled in the art to which the present disclosure pertains.

A power supply system of an aircraft may comprise: a fuel cell configured to generate electrical energy; a converter device configured to supply power to a first motor device via a first output terminal, wherein the converter device comprises a mode switch device configured to control a connection between an output node of the fuel cell and a first end of the mode switch device; a first battery device configured to supply a voltage from a first battery to a second motor device via a second output terminal, wherein the mode switch device is configured to control a connection between the first battery device and the first end of the mode switch device; and a processor configured to: operate in an emergency mode, based on a detection of an error associated with the converter device or an error associated with the first battery device, and control the mode switch device to connect the first end of the mode switch device with the first battery device.

The converter device may further comprise: a first converter switch and a second converter switch connected in series with each other between the first output terminal and a reference node; and a first inductor connected between the first end, of the mode switch device, and a node between the first converter switch and the second converter switch.

The first battery device may comprise: a first battery having a first electrode coupled to the second output terminal and a second electrode coupled to the reference node; and a first auxiliary converter switch and a second auxiliary converter switch connected in series with each other between the second output terminal and the reference node, wherein a node between the first auxiliary converter switch and the second auxiliary converter switch is connected to the mode switch device, such that the mode switch device controls a connection between the first end, of the mode switch device, and the node between the first auxiliary converter switch and the second auxiliary converter switch.

The processor may be configured to control the mode switch device, such that the first inductor and the node between the first auxiliary converter switch and the second auxiliary converter switch are connected with each other, in the emergency mode.

The processor may be configured to: enter into a first emergency mode based on an error associated with the fuel cell, calculate a required voltage between the first output terminal and the reference node, and control, based on a magnitude of the required voltage between the first output terminal and the reference node, operations of the first auxiliary converter switch, the second auxiliary switch, the first converter converter switch, and the second converter switch.

The processor may be configured to: keep the first auxiliary converter switch turned on and keep the second auxiliary converter switch turned off, based on a determination that the required voltage is greater than a voltage of the first battery in the first emergency mode, and adjust, based on the required voltage, a duty ratio of the first converter switch and the second converter switch.

The processor may be configured to: keep the first converter switch turned on and keep the second converter switch turned off, based on a determination that the required voltage is less than a voltage of the first battery in the first emergency mode, and adjust, based on the required voltage, a duty ratio of the first auxiliary converter switch and the second auxiliary converter switch.

The processor may be configured to: enter into a second emergency mode based on the error associated with the first battery device, calculate a required voltage between the second output terminal and the reference node, and control, based on a magnitude of the required voltage between the second output terminal and the reference node, operations of the first auxiliary converter switch, the second auxiliary converter switch, the first converter switch, and the second converter switch.

The processor may be configured to: keep the first converter switch turned on and keep the second converter switch turned off, based on a determination that the required voltage is greater than a voltage between the first output terminal and the reference node in the second emergency mode, and adjust, based on the required voltage, a duty ratio of the first auxiliary converter switch and the second auxiliary converter switch.

The processor may be configured to: keep the first auxiliary converter switch turned on and keep the second auxiliary converter switch turned off, based on a determination that the required voltage is less than a voltage between the first output terminal and the reference node in the second emergency mode, and adjust, based on the required voltage, a duty ratio of the first converter switch and the second converter switch.

The power supply system may further comprise a second battery device configured to supply a voltage to a third motor device via a third output terminal connected with a first electrode of a second battery, wherein the processor is configured to connect the second battery device to a second end of the mode switch device in the emergency mode.

The converter device may further comprise: a third converter switch and a fourth converter switch connected in series with each other between the first output terminal and the reference node; and a second inductor connected between the second end, of the mode switch device, and a node between the third converter switch and the fourth converter switch, wherein the second battery device comprises: a third auxiliary converter switch and a fourth auxiliary converter switch connected in series with each other between the third output terminal and the reference node, and wherein, in the emergency mode, the processor is configured to connect a node between the third auxiliary converter switch and the fourth auxiliary converter switch to the second end of the mode switch device.

The processor may be configured to: enter into a third emergency mode based on a detection of an error associated with the fuel cell and an error associated with the second battery device, control, based on a magnitude of a required voltage between the first output terminal and the reference node, operations of the first auxiliary converter switch, the second auxiliary converter switch, the first converter switch, and the second converter switch, and control, based on a magnitude of a required voltage between the third output terminal and the reference node, operations of the third converter switch, the fourth converter switch, the third auxiliary converter switch, and the fourth auxiliary converter switch.

A control method of a power supply system of an aircraft may comprise: connecting an output node of a fuel cell to a first end of a mode switch device of a converter device; supplying power from the fuel cell to a first motor device via a first output terminal of the converter device; supplying power from a first battery of a first battery device to a second motor device via a second output terminal of the first battery device; and based on a detection of an error associated with the fuel cell or an error associated with the first battery device, controlling the mode switch device to enter into an emergency mode and to connect the first battery device to the first end of the mode switch device.

The supplying of the power from the fuel cell to the first motor device may comprise: connecting the output node of the fuel cell and a first inductor, wherein the first inductor is connected to a node between a first converter switch and a second converter switch connected in series with each other between the first output terminal and a reference node.

The controlling of the mode switch device to connect the first battery device to the first end of the mode switch device may comprise: connecting the first inductor to a node between a first auxiliary converter switch and a second auxiliary converter switch connected in series with each other between a first electrode of the first battery and a second electrode of the first battery.

The controlling of the mode switch device to connect the first battery device to the first end of the mode switch device may comprise: entering into a first emergency mode based on a detection of the error associated with the fuel cell, calculating a required voltage between the first output terminal and the reference node; keeping the first auxiliary converter switch turned on and keeping the second auxiliary converter switch turned off, based on a determination that the required voltage is greater than a voltage of the first battery; and adjusting, based on the required voltage, a duty ratio of the first converter switch and the second converter switch.

The controlling of the mode switch device to connect the first battery device to the first end of the mode switch device may comprise: keeping the first converter switch turned on and keeping the second converter switch turned off, based on a determination that a required voltage between the first output terminal and the reference node is less than a voltage of the first battery in a first emergency mode; and adjusting, based on the required voltage, a duty ratio of the first auxiliary converter switch and the second auxiliary converter switch.

The controlling of the mode switch device to connect the first battery device to the first end of the mode switch device may comprise: entering into a second emergency mode in which an error associated with the first battery device occurs; calculating a required voltage between the second output terminal and the reference node; keeping the first converter switch turned on and keeping the second converter switch turned off, based on a determination that the required voltage is less than a voltage between the first output terminal and the reference node in the second emergency mode; and adjusting, based on the required voltage, a duty ratio of the first auxiliary converter switch and the second auxiliary converter switch.

The controlling of the mode switch device to connect the first battery device to the first end of the mode switch device may comprise: keeping the first auxiliary converter switch turned on and keeping the second auxiliary converter switch turned off, based on a determination that a required voltage between the second output terminal and the reference node is less than a voltage between the first output terminal and the reference node in a second emergency mode; and adjusting, based on the required voltage, a duty ratio of the first converter switch and the second converter switch.

The control method may further comprise: supplying power from a second battery of a second battery device to a third motor device via a third output terminal of the second battery device; and based on a detection of an error associated with the second battery device, controlling the mode switch device to enter into the emergency mode and to connect the second battery device to a second end of the mode switch device.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
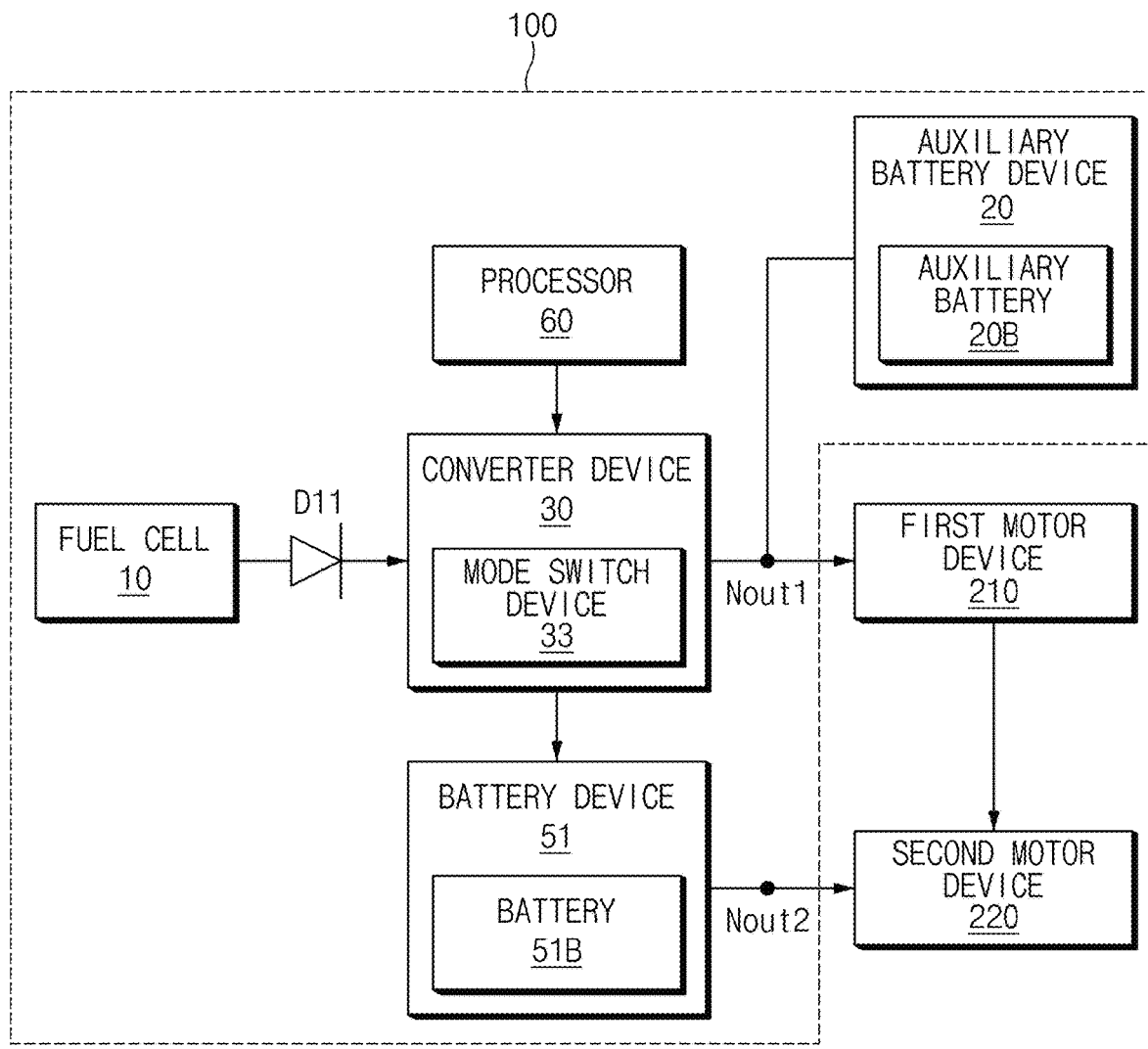
FIG. 1 a block diagram illustrating a configuration of a power supply system of an aircraft.

Hereinafter, various examples of the present disclosure will be described in detail with reference to the accompanying drawings. In adding the reference numerals to the components of each drawing, it should be noted that the identical component is designated by the identical numerals even when they are displayed on other drawings. Further, in describing the features of the present disclosure, a detailed description of well-known features or functions may be omitted in order not to unnecessarily obscure the gist of the present disclosure.

In describing the components of the embodiment(s) according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various examples of the present disclosure will be described in detail with reference to FIGS. 1 to 25.

FIG. 1 a block diagram illustrating a configuration of a power supply system of an aircraft. Hereinafter, the aircraft may refer to a mobility vehicle capable of flying over the sky. In other words, other than referring to the means of flight, such as a helicopter, a drone, and an airplane, the aircraft may include a vehicle capable of flying with its wheels off the ground while moving on the ground using the wheels or the like. The aircraft may include an unmanned aircraft and a manned aircraft. Furthermore, the manned aircraft may include an airframe capable of controlled by autonomous flight, other than an airframe controlled by a pilot.

Referring to FIG. 1, a power supply system 100 of an aircraft may supply power to a first motor device 210 and a second motor device 220. Each of the first motor device 210 and the second motor device 220 may be configured to drive a propeller for the flight of the aircraft, which may include one or more motors.

The power supply system 100 of the aircraft may include a fuel cell 10, an auxiliary battery device 20, a converter device 30, a battery device 51, and a processor 60.

The fuel cell 10 may electrochemically react fuel gas and oxygen to convert chemical energy into electrical energy. The fuel cell 10 may include one or more cells. Each cell may receive hydrogen gas included in fuel gas and air and may induce oxidation and reduction reactions to generate electrical energy. The cell may include a membrane and electrode assembly (MEA) which may be protected from the outside by an end plate and oxidize/reduce hydrogen gas and air and at least one separator for supplying fuel gas and air to the MEA.

The power supply system 100 may further include a balance of plant (BOP) for driving the fuel cell 10. The BOP may include a fuel supply device, an air supply device, a humidity and water adjustment device, a heat treatment device, and the like.

The auxiliary battery device 20 may include an auxiliary battery 20B and a circuit device. The auxiliary battery 20B may make up for low responsiveness where the fuel cell 10 outputs a voltage. The auxiliary battery 20B may be one battery or may be formed as two or more batteries connected in parallel with each other. The circuit device may control a timing when the auxiliary battery 20B supplies a voltage to a first output terminal Nout1, under control of the processor 60.

The converter device 30 may receive a voltage, output by the fuel cell 10 (e.g., through a rectifier diode D11) to boost the voltage and may supply the boosted voltage to the first motor device 210 through a first output terminal Nout1. The converter device 30 may distribute power generated by the fuel cell 10 to charge a battery 51B, under control of the processor 60.

To this end, the converter device 30 may include a mode switch device 33 and a half-bridge converter.

The half-bridge converter may include a pair of converter switches and an inductor.

The mode switch device 33 may be selectively connected with an output node Ns of the fuel cell 10. In other words, the mode switch device 33 may switch a connection between the output node Ns of the fuel cell 10 and the half-bridge converter, under control of the processor 60. In an example, the output node Ns of the fuel cell 10 may refer to a cathode electrode of the rectifier diode D11. The mode switch device 33 may switch a connection between the first output terminal Nout1 of the converter device 30 and a second output terminal Nout2 of the battery device 51, under control of the processor 60.

The battery device 51 may include the battery 51B and a circuit device. The battery 51B may supply a voltage to the first motor device 210 through the first output terminal Nout1. The battery 51B may be one battery or may be formed as two or more batteries connected in parallel with each other. The circuit device may control a timing when the battery 51B supplies a voltage to the second output terminal Nout2, under control of the processor 60.

The processor 60 may set a driving mode for adjusting a path where the converter device 30 outputs a voltage depending on the altitude of the aircraft.

The processor 60 may set the driving mode to a first mode in a take-off duration. The take-off duration may be a duration when the altitude of the aircraft is less than a predetermined first threshold altitude, after the aircraft is turned on (e.g., powered on).

In the first mode, the processor 60 may control the mode switch device 33 to connect the half-bridge converter of the converter device 30 with the output node Ns of the fuel cell 10. In the first mode, the processor 60 may control the mode switch device 33 to disconnect the connection between the half-bridge converter of the converter device 30 and the second output terminal Nout2 of the battery device 51.

As a result, in the first mode, the voltage output by the fuel cell 10 may be supplied to the first motor device 210 through the first output terminal Nout1, and the voltage output by the battery 51B may be supplied to the second motor device 220 through the second output terminal Nout2. In other words, in the take-off duration, based on a determination that the required power of the aircraft is high (e.g., higher than a threshold), the power supply system 100 may drive the first motor device 210 and the second motor device 220 using all output voltages of the fuel cell 10 and the battery 51B.

The processor 60 may set the driving mode to a second mode in a cruising duration. The cruising duration may be a duration where the aircraft ascends above a first threshold altitude and maintains a predetermined second threshold altitude or more. The second threshold altitude may be an altitude which is the same as or different from the first threshold altitude.

In the second mode, the processor 60 may control the mode switch device 33 to disconnect the half-bridge converter of the converter device 30 from the output node Ns of the fuel cell 10. In the second mode, the processor 60 may control the mode switch device 33 to connect the half-bridge converter of the converter device 30 with the second output terminal Nout2 of the battery device 51. In the cruising duration, the power supply system 100 may charge the battery 51B using power of the fuel cell 10.

In the cruising duration, the aircraft may generate thrust for a flight at a very low level of power in preparation for takeoff or landing under the influence of lift. Thus, the fuel cell 10 may charge the battery 51B using a portion of power capable of being generated.

Because the battery 51B is able to be charged using the power from the fuel cell 10 in the cruising duration du2, although the capacity of the battery 51B is reduced compared to before, the battery 51B may satisfy power consumed by the second motor device 220. Thus, the capacity of the battery 51B may be reduced. Thus, the manufacturing cost of the power supply system 100 may be reduced. Furthermore, because the capacity of the battery 51B is reduced, the weight of the aircraft may be decreased and a flight distance may be increased.

The processor 60 may detect an error and/or a failure in a power supply source to operate in an emergency mode and may control the mode switch device 33 to replace the power supply source in which the error and/or the failure is detected.

The emergency mode may be classified as a first emergency mode in which an error and/or a failure occurs in the fuel cell 10, a second emergency mode in which an error and/or a failure occurs in the first battery device 51, or a third emergency mode in which an error and/or a failure occurs in the second battery device 52. The emergency mode may include a fourth emergency mode in which an error and/or a failure in the fuel cell 10 and an error and/or a failure in the first battery device 51 or the second battery device 52 are detected. The error and/or the failure in the fuel cell 10 may be that an abnormal short or open phenomenon between the fuel cell 10 and the converter device 30 is detected. The error and/or the failure in the first battery device 51 or the second battery device 52 may be that an abnormal short or open phenomenon between the first battery 51B and the circuit device is detected or that an abnormal short or open phenomenon between the second battery 52B and the circuit device is detected.

Figure 2:
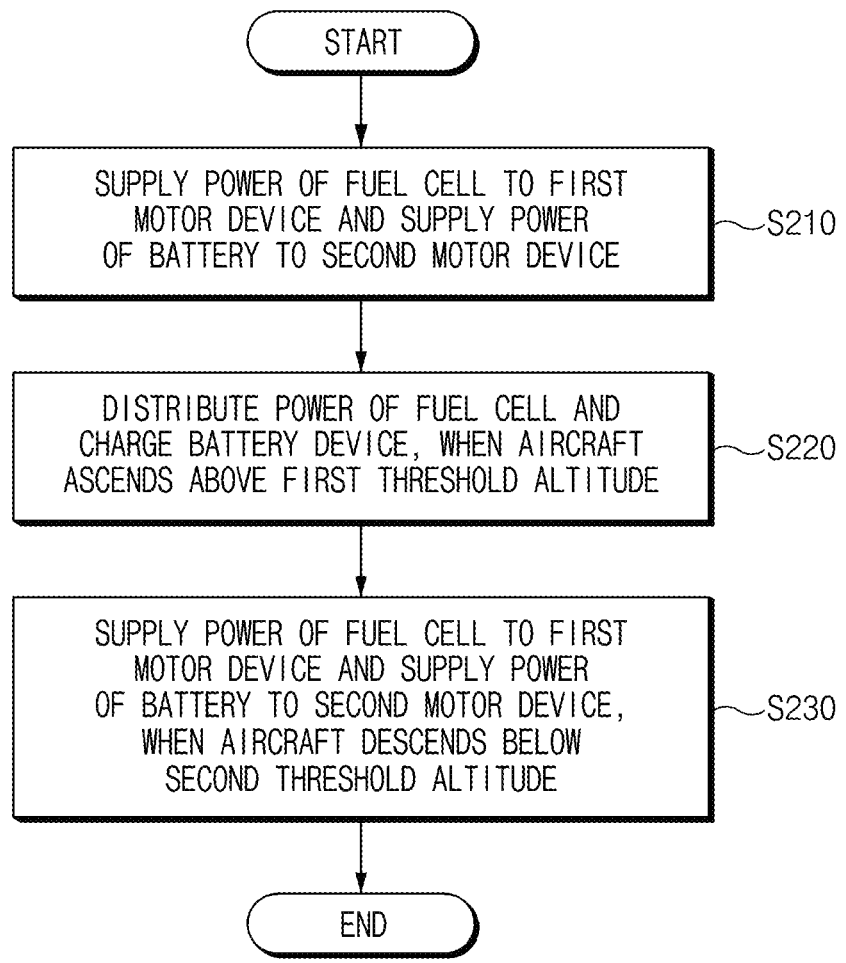
FIG. 2 is a flowchart for describing a control method of a power supply system of an aircraft.

FIG. 2 is a flowchart for describing a control method of a power supply system of an aircraft.

A description will be given of the control method of the power supply system of the aircraft with reference to FIGS. 1 and 2.

In S210, a processor 60 may control a power supply system 100 based on a first mode. For example, a converter device 30 may supply a voltage generated by a fuel cell 10 to a first motor device 210 through a first output terminal Nout1. A battery device 51 may supply the voltage to a second motor device 220 through a second output terminal Nout2.

In S220, if the aircraft ascends above a first threshold altitude, the processor 60 may control the power supply system 100 based on a second mode. For example, the processor 60 may control a mode switch device 33 to charge a battery 51B using the voltage of the first output terminal Nout1 of the converter device 30.

In S230, if the aircraft descends below a second threshold altitude, the processor 60 may control the power supply system 100 based on the first mode. The operation of the power supply system 100 in the first mode may be the same as the procedure in S210.

Figure 3:
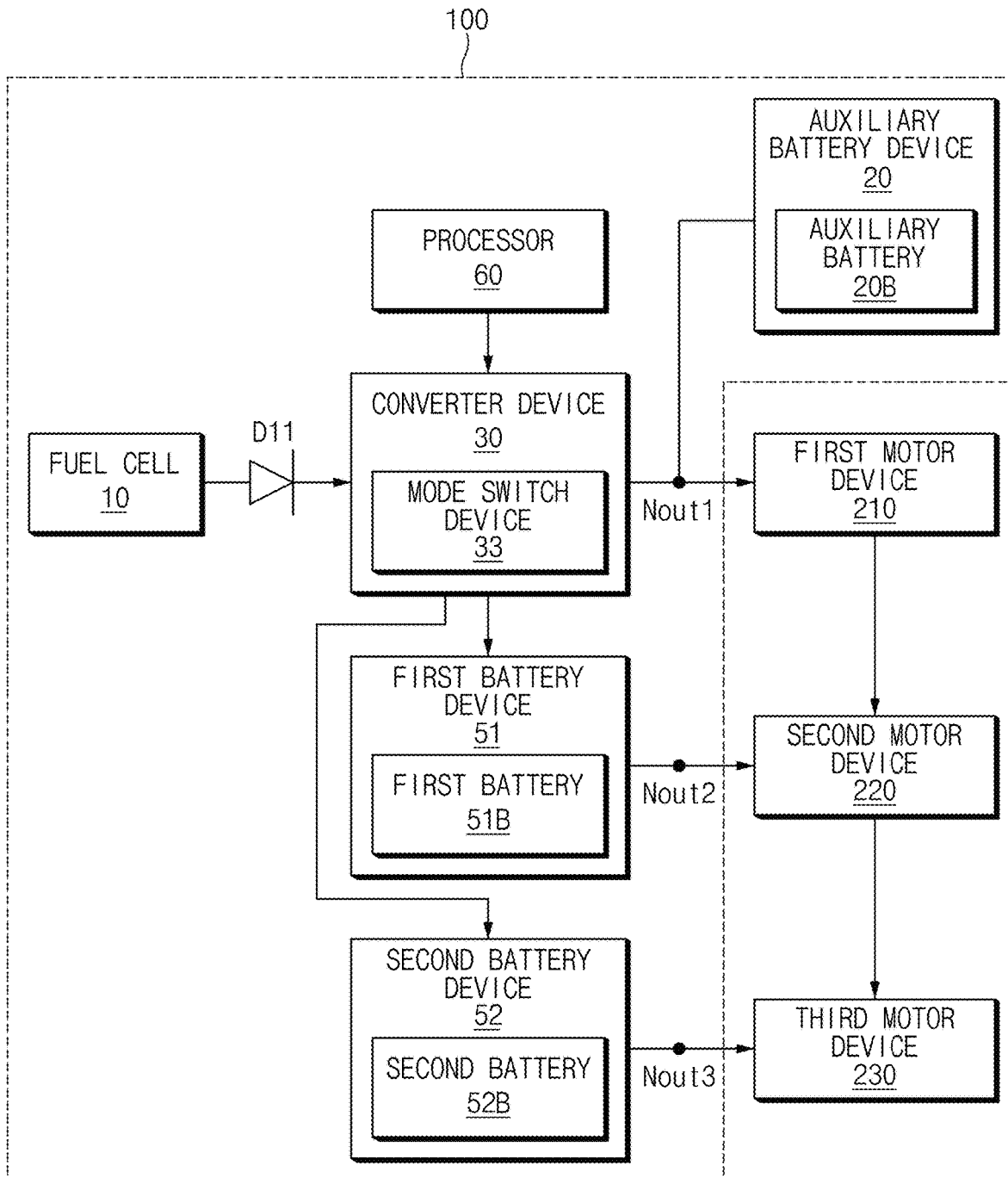
FIG. 3 is a block diagram illustrating a configuration of a power supply system of an aircraft.

FIG. 3 is a block diagram illustrating a configuration of a power supply system of an aircraft. A detailed description of substantially the same configuration as the above-described features will be omitted.

Referring to FIG. 3, a power supply system 100 of an aircraft may supply power to a first motor device 210, a second motor device 220, and a third motor device 230.

The power supply system 100 of the aircraft may include a fuel cell 10, an auxiliary battery 20B, a converter device 30, a first battery device 51, a second battery device 52, and a processor 60.

The fuel cell 10 may electrochemically react fuel gas and oxygen to convert chemical energy into electrical energy.

An auxiliary battery device 20 may include the auxiliary battery 20B and a circuit device. The auxiliary battery 20B may make up for low responsiveness where the fuel cell 10 outputs a voltage.

The converter device 30 may boost a voltage output by the fuel cell 10 and may supply the boosted voltage to the first motor device 210 through a first output terminal Nout1.

The converter device 30 may distribute power generated by the fuel cell 10 to charge a first battery 51B and a second battery 52B, under control of the processor 60.

To this end, the converter device 30 may include a mode switch device 33 and first and second half-bridge converters.

The first half-bridge converter may include a pair of converter switches and a first inductor. The second half-bridge converter may include another pair of converter switches and a second inductor.

The mode switch device 33 may be selectively connected with an output node Ns of the fuel cell 10. For example, under control of the processor 60, the mode switch device 33 may switch a connection between the output node Ns of the fuel cell 10 and the first half-bridge converter and may switch a connection between the output node Ns of the fuel cell 10 and the second half-bridge converter.

Under control of the processor 60, the mode switch device 33 may switch a connection between the first output terminal Nout1 of the converter device 30 and a second output terminal Nout2 of the first battery device 51 and may switch a connection between the first output terminal Nout1 of the converter device 30 and a third output terminal Nout3 of the second battery device 52.

The first battery device 51 may include the first battery 51B and a first circuit device. The first circuit device may control a timing when the first battery 51B supplies a voltage to the second output terminal Nout2, under control of the processor 60.

The second battery device 52 may include the second battery 52B and a second circuit device. The second circuit device may control a timing when the second battery 52B supplies a voltage to the third output terminal Nout3, under control of the processor 60.

The processor 60 may set a driving mode for adjusting a path where the converter device 30 outputs a voltage depending on the altitude of the aircraft.

The processor 60 may set the driving mode to a first mode in a take-off duration and a landing duration.

The processor 60 may set the driving mode to a second mode in a cruising duration. In the second mode, the processor 60 may control the mode switch device 33 to disconnect the first and second half-bridge converters of the converter device 30 from the output node Ns of the fuel cell 10. In the second mode, the processor 60 may control the mode switch device 33 to connect the first half-bridge converter of the converter device 30 with the second output terminal Nout2 of the first battery device 51 and connect the second half-bridge converter of the converter device 30 with the third output terminal Nout3 of the second battery device 52. As a result, in the cruising duration, the power supply system 100 may charge the first battery 51B and the second battery 52B using power of the fuel cell 10.

Figure 4:
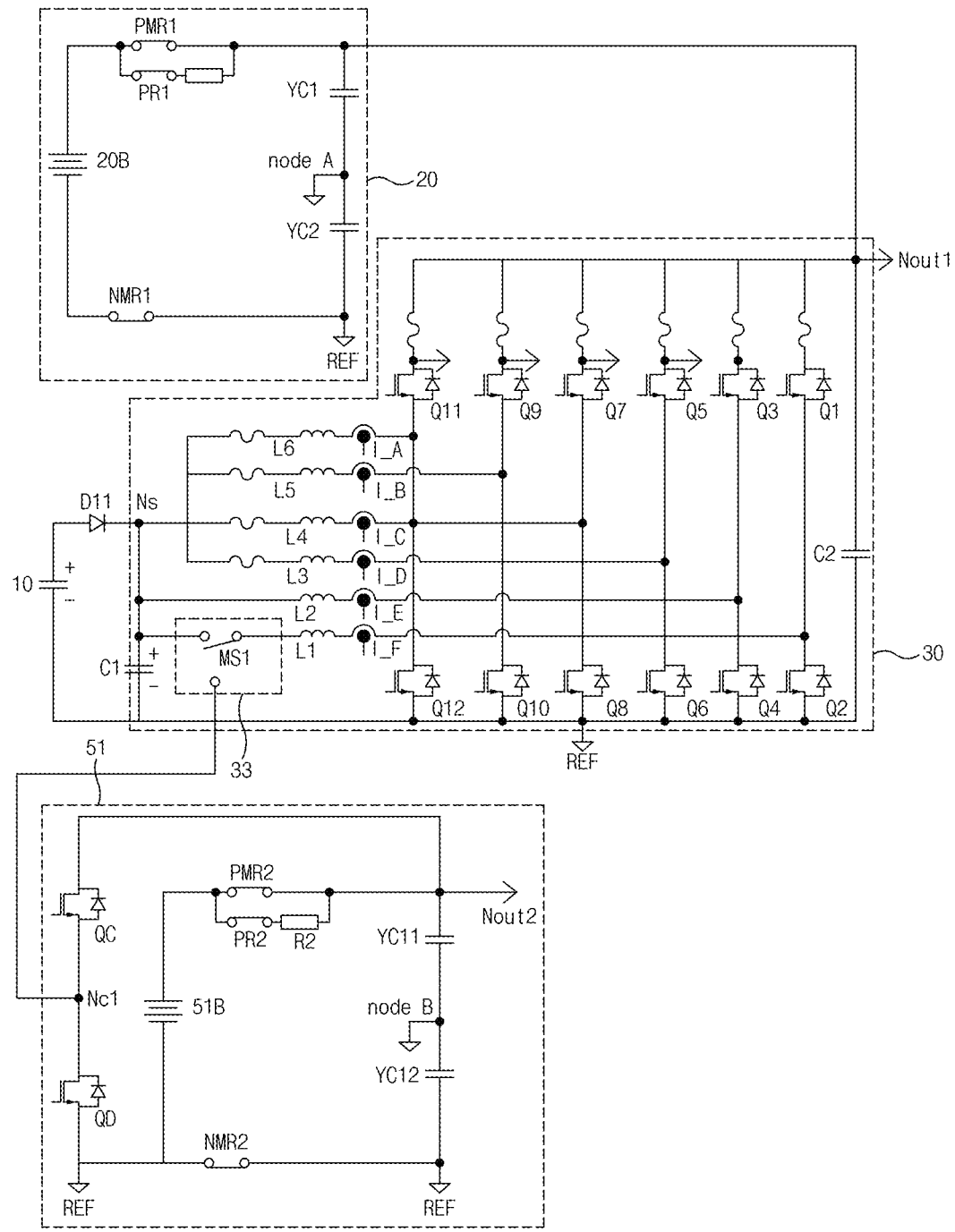
FIG. 4 is a circuit diagram illustrating a power supply system of an aircraft.

FIG. 4 is a circuit diagram illustrating a power supply system of an aircraft. FIG. 4 may be a circuit diagram of a power supply system of an aircraft shown in FIG. 1.

Referring to FIG. 4, a power supply system 100 of the aircraft may include an auxiliary battery device 20, a converter device 30, and a first battery device 51.

The auxiliary battery device 20 may include an auxiliary battery 20B and a circuit device for controlling a timing when a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

A first electrode of the auxiliary battery 20B may be connected with the first output terminal Nout1, and a second electrode of the auxiliary battery 20B may be connected with a reference node (e.g., a neutral node, the ground GND, etc., which has a reference voltage potential). The first electrode may be referred to as a positive electrode, and the second electrode may be referred to as a negative electrode. The first Y capacitor YC1 and the second Y capacitor YC2 may be connected in series with each other between the first output terminal Nout1 and the reference node (e.g., a neutral node, ground GND, etc., which has a reference voltage potential). A node between the first Y capacitor YC1 and the second Y capacitor YC2 may be connected with a node A (e.g., a node, such as a second neutral node, which has a voltage potential different from the reference voltage potential of the reference node). If the reference node is not connected to a chassis, the node A may be connected to the chassis. If the reference node is connected to the chassis, the node A may not be connected to the chassis. The first Y capacitor YC1 and the second Y capacitor YC2 may be for noise cancellation and interference suppression.

The first positive relay RMR1 may be connected between the first electrode of the auxiliary battery 20B and the first output terminal Nout1, and the first negative relay NMR1 may be connected between the second electrode of the auxiliary battery 20B and the reference node. The first precharge relay PR1 may be connected in parallel with the first positive relay RMR1, and a precharge resistor may be connected in series with the PR1.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the fifth switching device (Q9 and Q10) and a fifth inductor L5. The sixth half-bridge converter may include the sixth switching device (Q11 and Q12) and a sixth inductor L6.

The first to sixth switching devices may alternately switch a voltage passing through a rectifier diode D11 from a fuel cell 10.

Each of the first to sixth switching devices may include a pair of converter switches which are connected in series with each other between a first output terminal Nout1 and the reference node. For example, the first switching device (Q1 and Q2) may include the first converter switch Q1 and the second converter switch Q2, which are connected in series with each other between the first output terminal Nout1 and the reference node. The second switching device (Q3 and Q4) may include the third converter switch Q3 and the fourth converter switch Q4, which are connected in series with each other between the first output terminal Nout1 and the reference node. The third switching device (Q5 and Q6) may include the fifth converter switch Q5 and the sixth converter switch Q6, which are connected in series with each other between the first output terminal Nout1 and the reference node. The fourth switching device (Q7 and Q8) may include the seventh converter switch Q7 and the eighth converter switch Q8, which are connected in series with each other between the first output terminal Nout1 and the reference node. The fifth switching device (Q9 and Q10) may include the ninth converter switch Q9 and the tenth converter switch Q10, which are connected in series with each other between the first output terminal Nout1 and the reference node. The sixth switching device (Q11 and Q12) may include the eleventh converter switch Q11 and the twelfth converter switch Q12, which are connected in series with each other between the first output terminal Nout1 and the reference node.

The mode switch device 33 may include a first mode switch MS1.

The first mode switch MS1 may switch a connection between an output node Ns of a fuel cell 10 and a first half-bridge converter. The first mode switch MS1 may switch a connection between the first half-bridge converter and a second output terminal Nout2. To this end, the first mode switch MS1 may be a single pole double throw (SPDT) relay which connects the first inductor L1 with a cathode of the rectifier diode D11 or the second output terminal Nout2.

The first battery device 51 may include a first auxiliary converter device, a first battery 51B, and a circuit device for controlling a timing when a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The first auxiliary converter device may include a first auxiliary converter switch QC and a second auxiliary converter switch QD. The first auxiliary converter switch QC and the second auxiliary converter switch QD may be connected in series with each other between the second output terminal Nout2 and a reference node (e.g., a neutral node, the ground GND, etc., which has a reference voltage potential). The reference node in the first battery device 51 and the reference node in the auxiliary battery device 20 may have the same voltage potential or different voltage potentials. Throughout the disclosure, the reference node in the first battery device 51 and the reference node in the auxiliary battery device 20 may be described as the same reference node, but aspects are not limited thereto. A node between the first auxiliary converter switch QC and the second auxiliary converter switch QD may be connected with a node between the first mode switch MS1 and the first inductor L1.

A first electrode of the first battery 51B may be connected with the second output terminal Nout2, and a second electrode of the first battery 51B may be connected with the reference node. The first electrode may be referred to as a positive electrode, and the second electrode may be referred to as a negative electrode. The eleventh Y capacitor YC11 and the twelfth Y capacitor YC12 may be connected in series with each other between the second output terminal Nout2 and the reference node. A node between the eleventh Y capacitor YC11 and the twelfth Y capacitor YC12 may be connected with a node B (e.g., a node, such as a second neutral node, which has a voltage potential different from the reference voltage potential of the reference node). If the reference node is not connected to a chassis, the node B may be connected to the chassis. If the reference node is connected to the chassis, the node B may not be connected to the chassis. The node A and the node B may have the same voltage potential or different voltage potentials. The eleventh Y capacitor YC11 and the twelfth Y capacitor YC12 may be for noise cancellation and interference suppression.

The second positive relay RMR2 may be connected between the first electrode of the first battery 51B and the second output terminal Nout2, and the second negative relay NMR2 may be connected between the second electrode of the first battery 51B and the reference node. A second precharge relay PR2 may be connected in parallel with the second positive relay RMR2, and a second precharge resistor R2 may be connected in series with the second precharge relay PR2.

Figure 6:
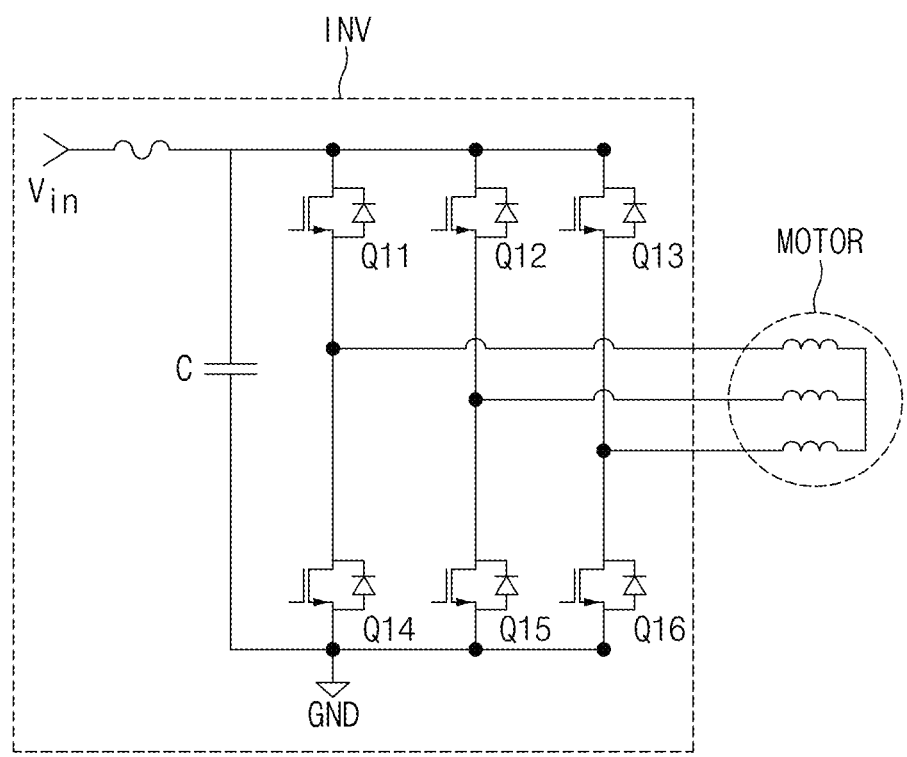
FIG. 6 is a circuit diagram illustrating an example of a monitor device.

FIG. 6 is a circuit diagram illustrating an example of a monitor device.

Referring to FIG. 6, each of a first motor device 210 and a second motor device 220 may include an inverter INV for driving a motor.

The inverter INV may include a U-phase voltage generator (Q11 and Q14), a V-phase voltage generator (Q12 and Q15), and a W-phase voltage generator (Q13 and Q16) to convert an input voltage into a three-phase voltage and supply the three-phase voltage to the motor. An output terminal of each of the voltage generators may be connected with a three-phase voltage input terminal of the motor.

An input voltage Vin may be a voltage supplied from a first output terminal Nout of a converter device 30, a first output terminal Nout1 of a first battery device 51, or a second output terminal Nout2 of a second battery device 52.

Figure 5:
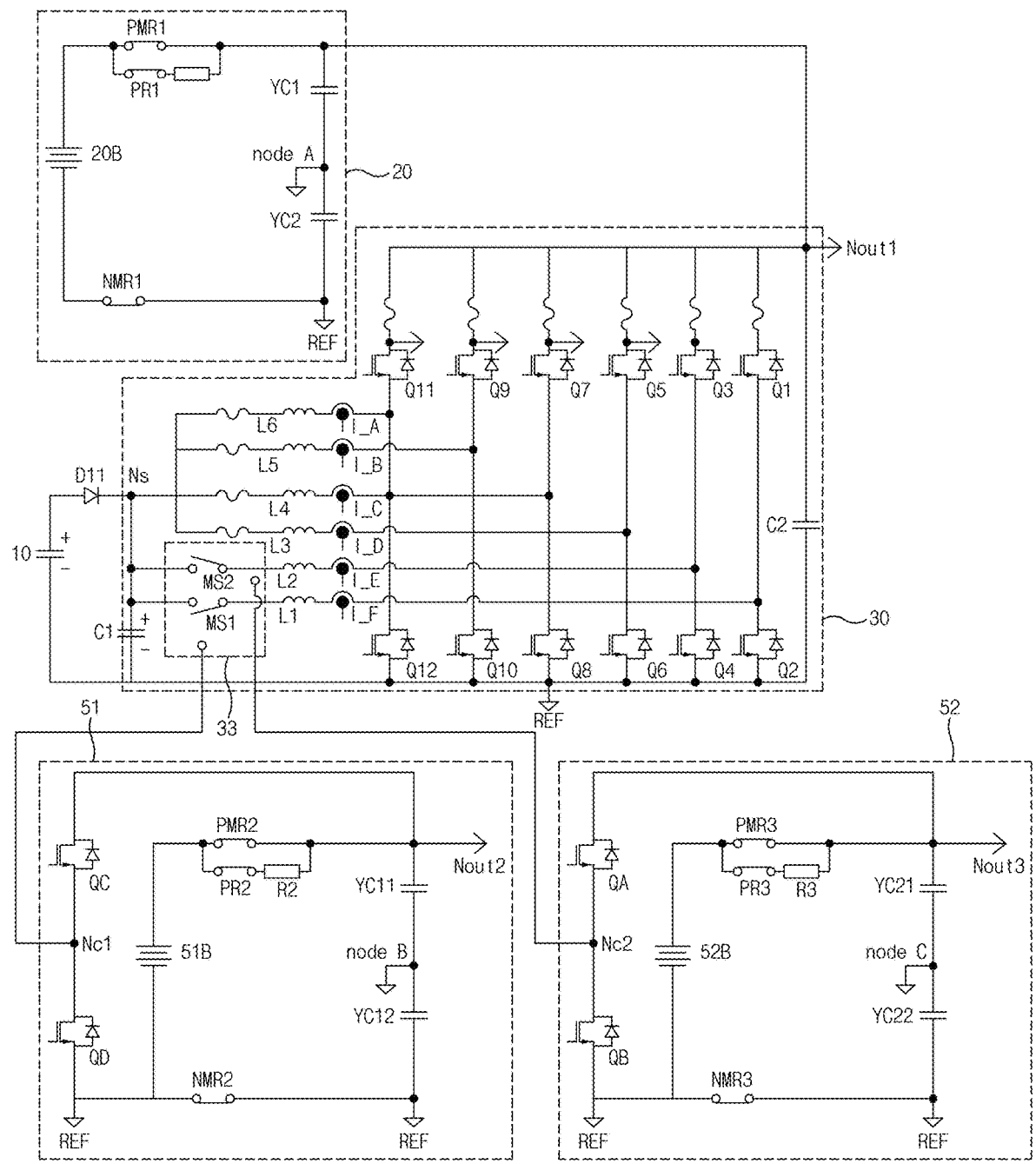
FIG. 5 is a circuit diagram illustrating an example of a power supply system of an aircraft.

FIG. 5 is a circuit diagram illustrating an example of a power supply system of an aircraft. FIG. 5 may be a circuit diagram illustrating an example of a power supply system shown in FIG. 3. A detailed description of substantially the same configuration as the above-described features (e.g., features described with respect to FIGS. 1-4 and 6) will be omitted.

Referring to FIG. 5, a power supply system 100 of an aircraft may include an auxiliary battery device 20, a converter device 30, a first battery device 51, and a second battery device 52.

The auxiliary battery device 20 may include an auxiliary battery 20B and a circuit device for controlling a timing when a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the fifth switching device (Q9 and Q10) and a fifth inductor L5. The sixth half-bridge converter may include the sixth switching device (Q11 and Q12) and a sixth inductor L6.

The first to sixth switching devices may alternately switch a voltage passing through a rectifier diode D11 from a fuel cell 10.

Each of the first to sixth switching devices may include a pair of converter switches which are connected in series with each other between the first output terminal Nout1 and the reference node. For example, the first switching device (Q1 and Q2) may include the first converter switch Q1 and the second converter switch Q2, which are connected in series with each other between the first output terminal Nout1 and the reference node. The second switching device (Q3 and Q4) may include the third converter switch Q3 and the fourth converter switch Q4, which are connected in series with each other between the first output terminal Nout1 and the reference node. The third switching device (Q5 and Q6) may include the fifth converter switch Q5 and the sixth converter switch Q6, which are connected in series with each other between the first output terminal Nout1 and the reference node. The fourth switching device (Q7 and Q8) may include the seventh converter switch Q7 and the eighth converter switch Q8, which are connected in series with each other between the first output terminal Nout and the reference node. The fifth switching device (Q9 and Q10) may include the ninth converter switch Q9 and the tenth converter switch Q10, which are connected in series with each other between the first output terminal Nout1 and the reference node. The sixth switching device (Q11 and Q12) may include the eleventh converter switch Q11 and the twelfth converter switch Q12, which are connected in series with each other between the first output terminal Nout1 and the reference node.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a second output terminal Nout2.

The second mode switch MS2 may be a single pole double throw (SPDT) relay which connects the second inductor L2 with the cathode of the rectifier diode D11 or a third output terminal Nout3.

The first battery device 51 may include a first auxiliary converter device, a first battery 51B, and a circuit device for controlling a timing when a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

A first electrode of the first battery 51B may be connected with the second output terminal Nout2, and a second electrode of the first battery 51B may be connected with the reference node. The first electrode may be referred to as a positive electrode, and the second electrode may be referred to as a negative electrode.

The second battery device 52 may include a second auxiliary converter device, a second battery 52B, and a circuit device for controlling a timing when a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The second auxiliary converter device may include a third auxiliary converter switch QA and a fourth auxiliary converter switch QB. The third auxiliary converter switch QA and the fourth auxiliary converter switch QB may be connected in series with each other between the third output terminal Nout3 and the reference node. A node between the third auxiliary converter switch QA and the fourth auxiliary converter switch QB may be connected with a node between the second mode switch MS2 and the second inductor L2.

A first electrode of the second battery 52B may be connected with the third output terminal Nout3, and a second electrode of the second battery 52B may be connected with the reference node. The first electrode may be referred to as a positive electrode, and the second electrode may be referred to as a negative electrode. The 21st Y capacitor YC21 and the 22nd Y capacitor YC22 may be connected in series with each other between the third output terminal Nout3 and the reference node. A node between the 21st Y capacitor YC21 and the 22nd Y capacitor YC22 may be connected with a node C (e.g., a node, such as a second neutral node, which has a voltage potential different from the reference voltage potential of the reference node). The node B and the node C may have the same voltage potential or different voltage potentials. The 21st Y capacitor YC21 and the 22nd Y capacitor YC22 may be for noise cancellation and interference suppression.

The third positive relay RMR3 may be connected between the first electrode of the second battery 52B and the third output terminal Nout3, and the third negative relay NMR3 may be connected between the second electrode of the second battery 52B and the reference node. The third precharge relay PR3 may be connected in parallel with the third positive relay RMR3, and a third precharge resistor may be connected in series with the third precharge relay RP3.

Hereinafter, a description will be given of a control method of a power supply system of an aircraft with reference to FIGS. 7 to 11. FIGS. 7 to 11 describe a control method of a power supply system of an aircraft according to the configuration shown in FIG. 5.

Figure 7:
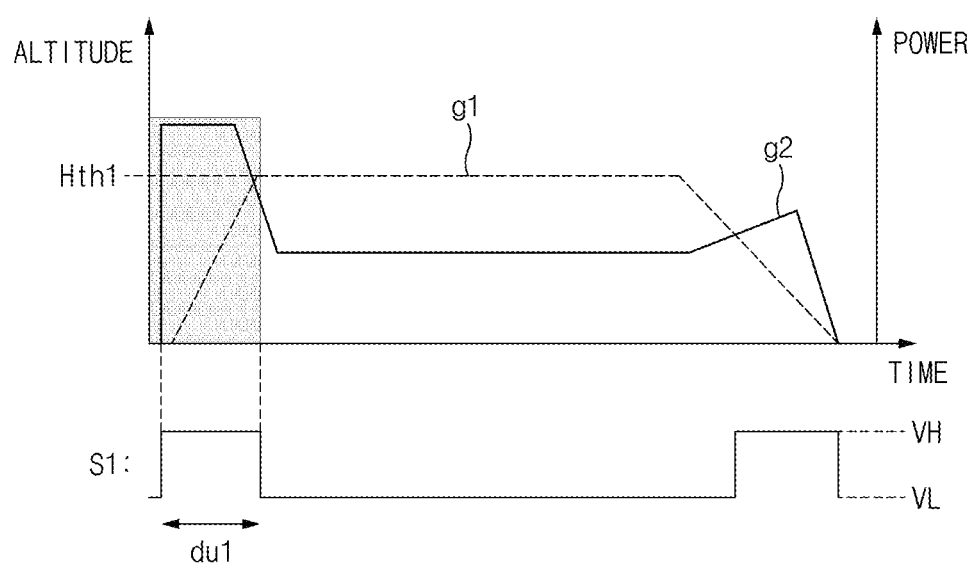
FIG. 7 is a drawing illustrating a control signal in a take-off duration.
Figure 8:
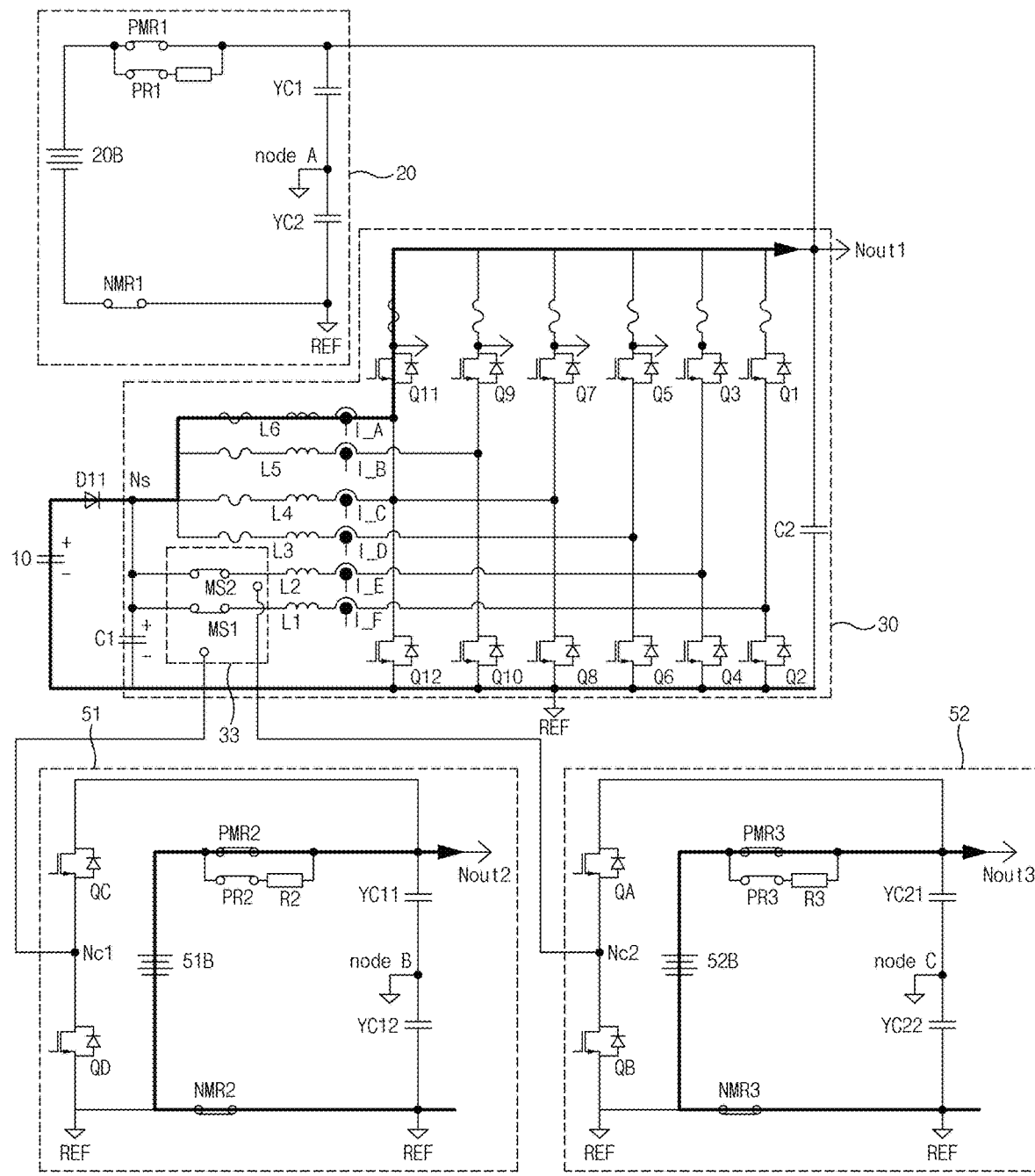
FIG. 8 is a drawing for describing power of a power supply system in a take-off duration.

FIG. 7 is a diagram illustrating a control signal in a take-off duration. In FIG. 7, g1 shows a change in altitude over time, and g2 shows required power over time. In FIG. 7, the power may refer to thrust required by the aircraft. FIG. 8 is a diagram for illustrating power of a power supply system in a take-off duration.

Referring to FIGS. 7 and 8, in a take-off duration, a processor 60 may operate a power supply system 100.

The processor 60 may operate an auxiliary battery device 20 in response to that the aircraft is turned on.

To this end, in a state where a first positive relay PMR1 is opened, the processor 60 may close a first precharge relay PR1 and a first negative relay NMR1. Thus, a first output terminal Nout1 may be precharged with a link voltage.

Next, in the state where the first negative relay NMR1 is closed, the processor 60 may open the first precharge relay PR1 and may close the first positive relay PMR1, thus supplying a voltage of the auxiliary battery 20B to the first output terminal Nout1.

As such, the processor 60 may supply the voltage to the first output terminal Nout1 through the auxiliary battery device 20, thus increasing responsiveness where the power supply system supplies power at the moment when power required by the aircraft increases rapidly.

The processor 60 may output a first control signal S1 as a high-level voltage to drive the power supply system based on a first mode based on a determination that the aircraft is turned on (e.g., powered on). The first control signal S1 may be a signal for controlling a first mode switch MS1 and a second mode switch MS2. If the first control signal S1 has a high-level voltage VH, the first mode switch MS1 may connect a first inductor L1 with an output node Ns of a fuel cell 10. If the first control signal S1 has the high-level voltage VH, the second mode switch MS2 may connect a second inductor L2 with the output node Ns of the fuel cell 10.

If the first mode switch MS1 is controlled by a magnetic field caused by a coil (not shown) for relay control, the first control signal S1 may be a signal for controlling current flow in the coil for relay control.

As the first inductor L1 and the output node Ns of the fuel cell 10 are connected with each other, a first half-bridge converter including a first converter switch Q1, a second converter switch Q2, and a first inductor L1 may boost and supply a voltage generated by the fuel cell 10 to the first output terminal Nout1.

As the second inductor L2 and the output node Ns of the fuel cell 10 are connected with each other, a second half-bridge converter including a third converter switch Q3, a fourth converter switch Q4, and a second inductor L2 may boost and supply the voltage generated by the fuel cell 10 to the first output terminal Nout1.

As a result, in the take-off duration du1, a converter device 30 may supply a voltage output by the fuel cell 10 to a first motor device 210 through the first output terminal Nout1.

In the take-off duration du1, a second link voltage $V_{C2}$ may be determined by an output node voltage of the fuel cell 10 and a turn-on duty ratio of converter switches. In detail, the second link voltage $V_{C2}$ (the voltage across the capacitor C2) may be represented as Equation 1 below.

$$V_{C2} = \frac{V_{C1}}{1-D1} \quad \text{[Equation 1]}$$

In Equation 1 above, $V_{C1}$ (the voltage across the capacitor C1) may refer to the first link voltage, and D1 may refer to the turn-on duty ratio of the second converter switch Q2, the fourth converter switch Q4, the sixth converter switch Q6, the eighth converter switch Q8, the tenth converter switch Q10, and the twelfth converter switch Q12.

In the take-off duration du1, a first battery device 51 may supply a voltage to a second motor device 220.

To this end, in a state where a second positive relay PMR2 is opened, the processor 60 may close a second precharge relay PR2 and a second negative relay NMR2. Thus, a second output terminal Nout2 may be precharged with a link voltage.

Next, in the state where the second negative relay NMR2 is closed, the processor 60 may open the second precharge relay PR2 and may close the second positive relay PMR2, thus supplying a voltage of the first battery 51B to a second output terminal Nout2.

In the take-off duration du1, a second battery device 52 may supply a voltage to a third motor device 230.

To this end, in a state where a third positive relay PMR3 is opened, the processor 60 may close a third precharge relay PR3 and a third negative relay NMR3. Thus, a third output terminal Nout3 may be precharged with a link voltage.

Next, in the state where the third negative relay NMR3 is closed, the processor 60 may open the third precharge relay PR3 and may close the third positive relay PMR3, thus supplying a voltage of the second battery 52B to a third output terminal Nout3.

Figure 9:
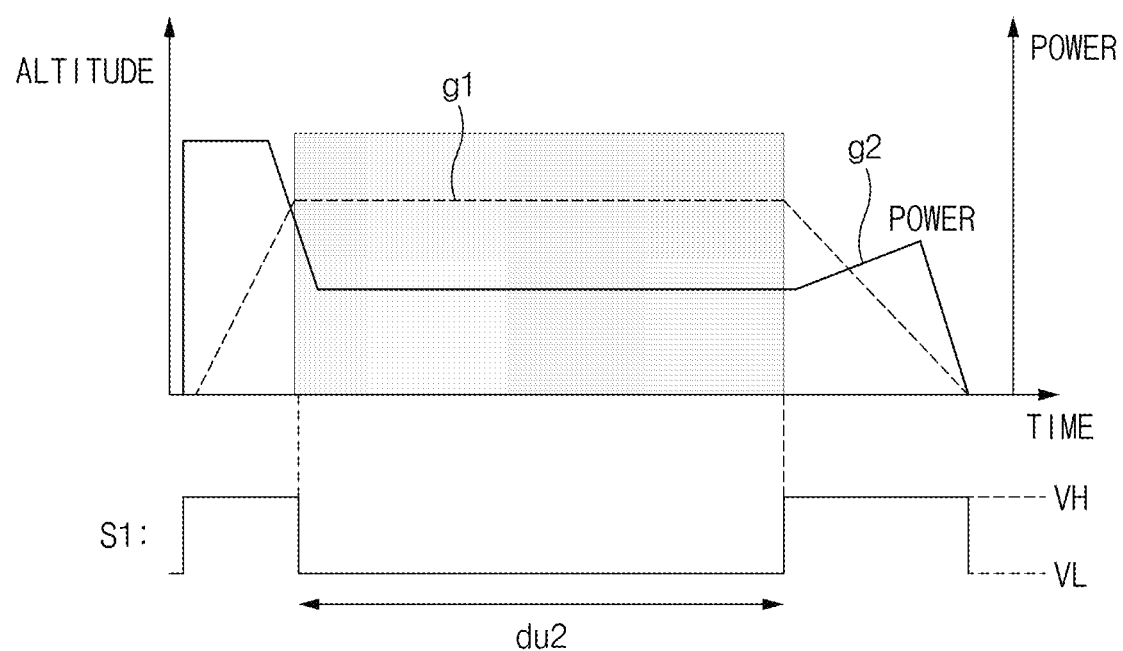
FIG. 9 is a drawing illustrating a first control signal in a flight duration.
Figure 10:
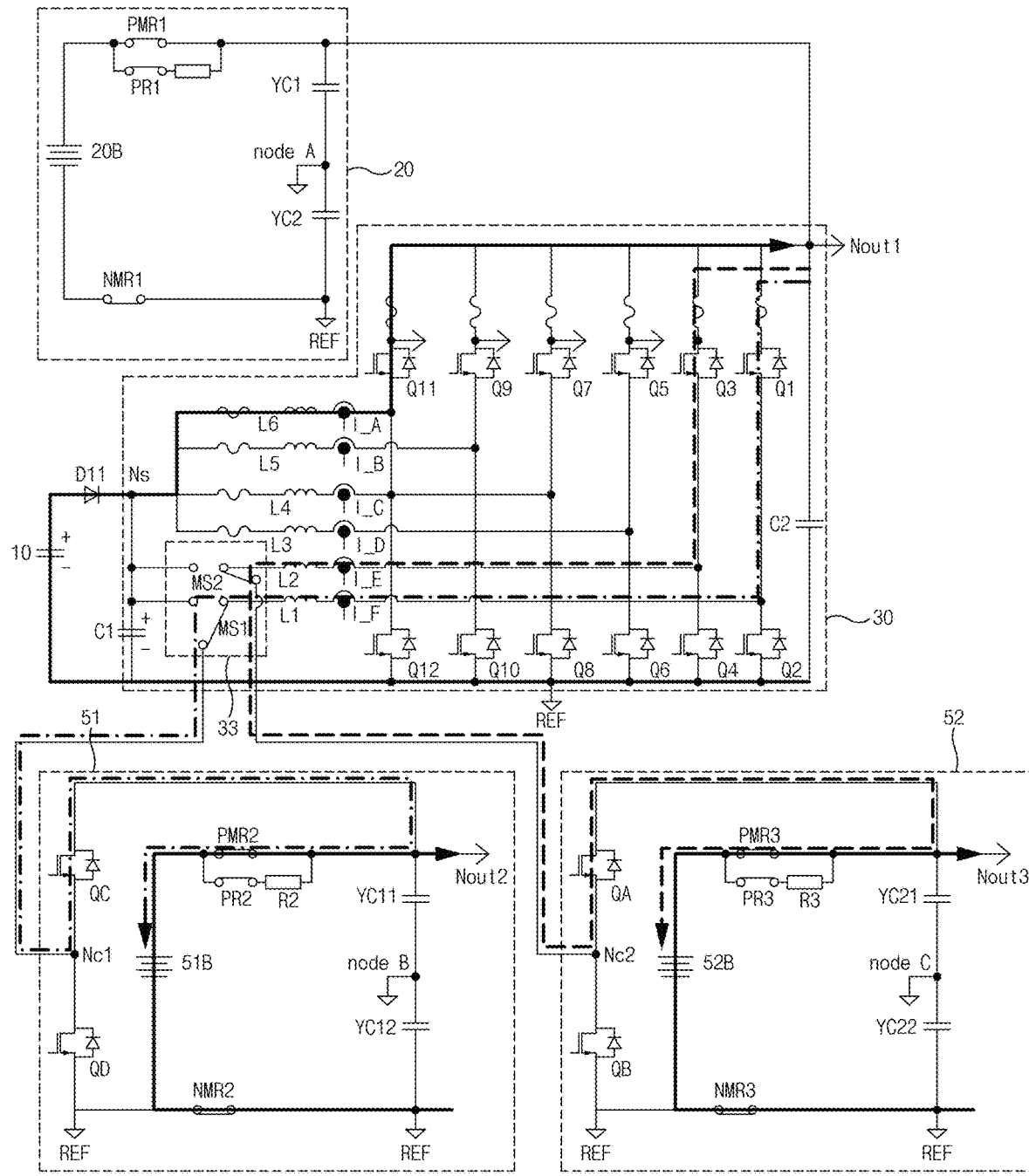
FIG. 10 is a drawing illustrating power of a power supply system in a cruising duration.

FIG. 9 is a diagram illustrating a first control signal in a flight duration. FIG. 10 is a diagram illustrating power of a power supply system in a cruising duration.

Referring to FIGS. 9 and 10, a processor 60 may monitor altitude information of an aircraft.

If the aircraft ascends above a predetermined first threshold altitude Hth1, the processor 60 may determine that it is in a cruising duration du2.

In the cruising duration du2, the processor 60 may output a first control signal S1 as a low-level voltage VL to drive a power supply system based on a second mode. The first control signal S1 of the low-level voltage VL may cause the first mode switch MS1 to connect a first inductor L1 with a node between a first auxiliary converter switch QC and a second auxiliary converter switch QD. At the same time, the first inductor L1 and an output node Ns of a fuel cell 10 may be separated from each other by the first control signal S1 of the low-level voltage VL. Thus, a first converter switch Q1, a second converter switch Q2, the first inductor L1, the first auxiliary converter switch QC, and the second auxiliary converter switch QD may form a first H bridge converter.

A voltage of a first output terminal Nout1 may be supplied to a first battery 51B through a second output terminal Nout2, using the first H bridge converter. Thus, the first battery 51B may be charged based on the voltage from the first output terminal Nout1.

The voltage charged in the first battery 51B may be proportional to a second link voltage $V_{C2}$ and a duty ratio. In other words, the voltage charged in the first battery 51B may be represented as Equation 2 below.

$$V_{51B} = V_{C2} \times D2 \quad \text{[Equation 2]}$$

In Equation 2 above, $V_{51B}$ may refer to the magnitude of the voltage charged in the first battery 51B, and D2 may refer to the turn-on duty ratio of the first converter switch Q1 and the first auxiliary converter switch QC.

Thus, the processor 60 may determine the turn-on duty ratio of the first converter switch Q1 and the first auxiliary converter switch QC to determine a magnitude of the voltage distributed to the second output terminal Nout2.

In response to the first control signal S1 of the low-level voltage VL, a second mode switch MS2 may connect a second inductor L2 with a node between a third auxiliary converter switch QA and a fourth auxiliary converter switch QB. Thus, a third converter switch Q3, a fourth converter switch Q4, the second inductor L2, the third auxiliary converter switch QA, and the fourth auxiliary converter switch QB may form a second H bridge converter.

The voltage of the first output terminal Nout1 may be supplied to a second battery 52B through the third output terminal Nout3, using the second H bridge converter. Thus, the second battery 52B may be charged based on the voltage from the first output terminal Nout1.

The voltage charged in the second battery 52B may be proportional to a second link voltage $V_{C2}$ and a duty ratio. In other words, the voltage charged in the first battery 52B may be represented as Equation 3 below.

$$V_{52B} = V_{C2} \times D3 \quad \text{[Equation 3]}$$

In Equation 3 above, $V_{52B}$ may refer to the magnitude of the voltage charged in the second battery 52B, and D3 may refer to the turn-on duty ratio of the third converter switch Q3 and the third auxiliary converter switch QA.

Thus, the processor 60 may determine the turn-on duty ratio of the third converter switch Q3 and the third auxiliary converter switch QA to determine a magnitude of the voltage distributed to the third output terminal Nout3.

As a result, in the cruising duration du2, a converter device 30 may distribute the voltage output by the fuel cell 10 to the first output terminal Nout1 and the second output terminal Nout2.

Figure 11:
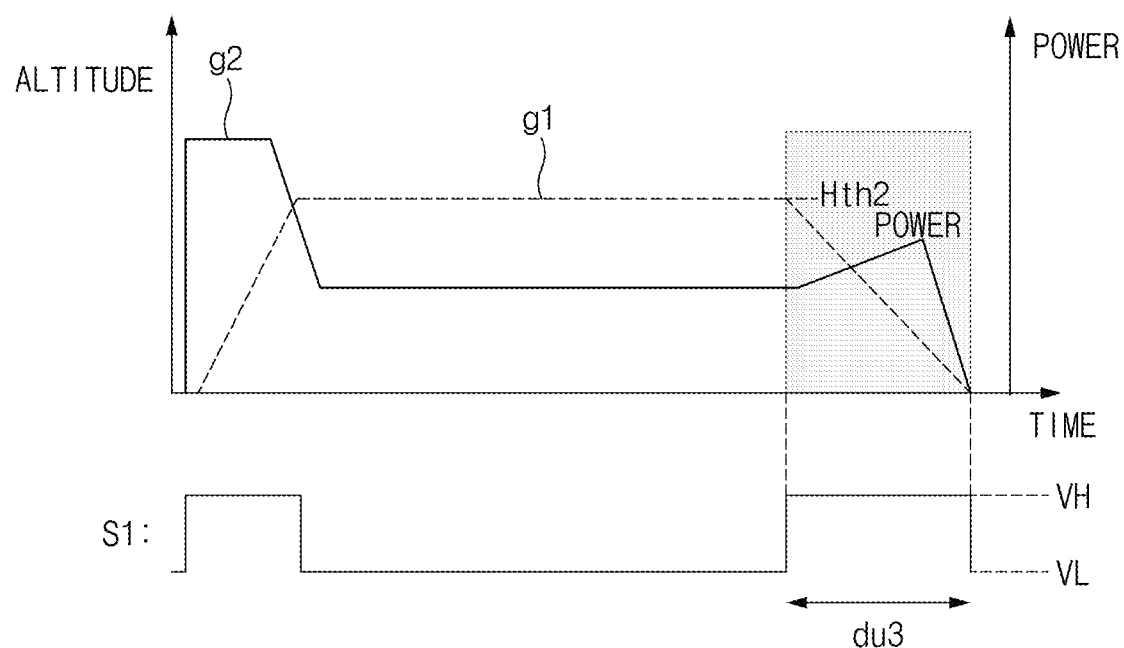
FIG. 11 is a drawing illustrating power of a power supply system in a landing duration.

FIG. 11 is a diagram illustrating power of a power supply system in a landing duration.

If the aircraft descends below a predetermined second threshold altitude Hth2, a processor 60 may determine that it enters a landing duration du3. The second threshold altitude Hth2 may be set to an altitude which is the same as or different from a first threshold altitude Hth1.

In the landing duration du3, the processor 60 may output a first control signal S1 as a high-level voltage VH to drive a power supply system based on the first mode.

As a result, in the landing duration du3, the power supply system may operate to be the same as that shown in FIG. 8.

Figure 12:
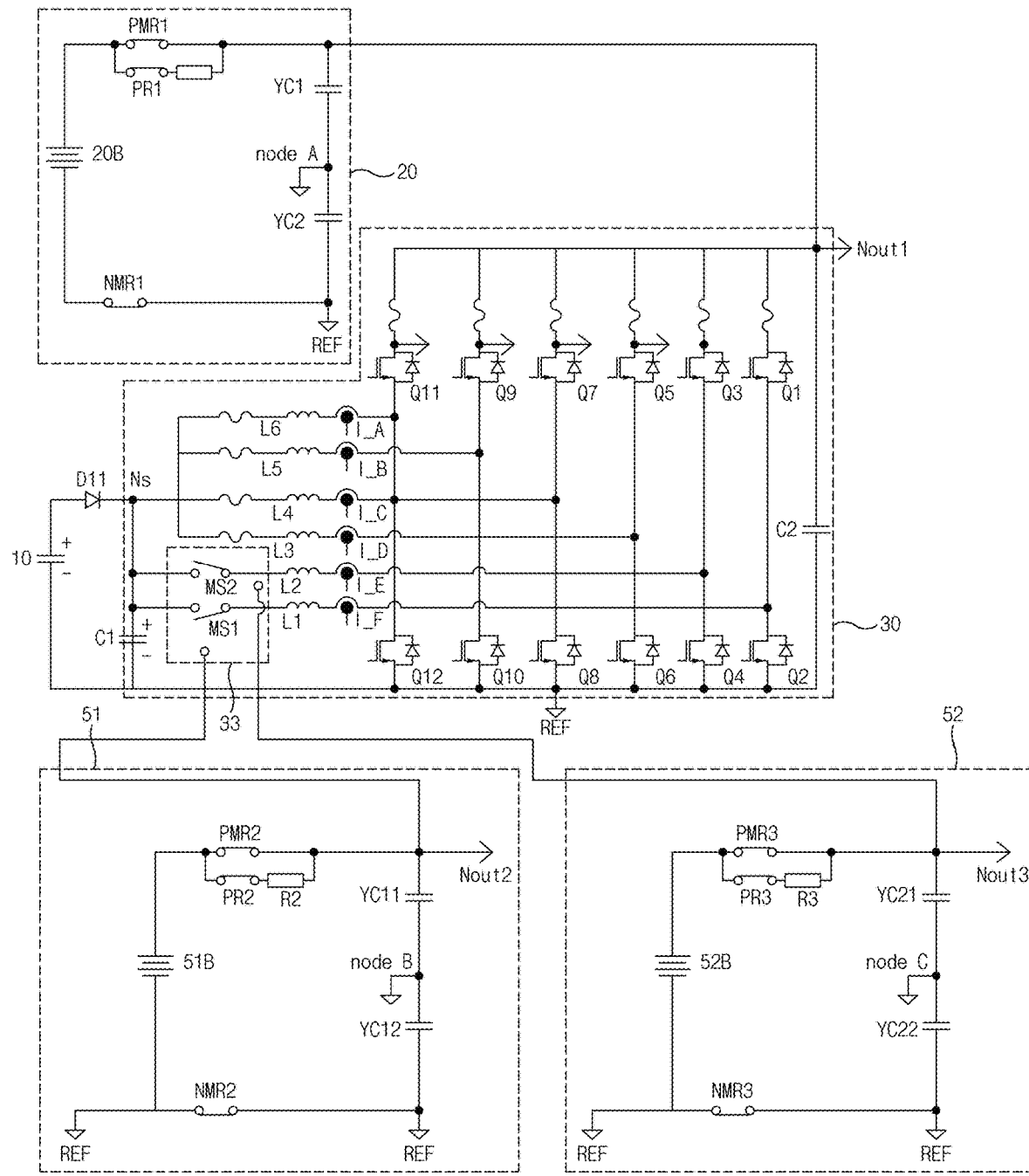
FIG. 12 is a circuit diagram illustrating an example of a power supply system.

FIG. 12 is a circuit diagram illustrating an example of a power supply system. FIG. 12 may be a circuit diagram implementing a power supply system shown in FIG. 3. A detailed description of substantially the same configuration described above will be omitted. Unlike the above figures, switches QA, QB, QC, and QD are omitted in FIG. 12. Thus, in FIG. 12, the first mode switch MS1 may connect the first inductor L1 with the second output terminal Nout2, and the second mode switch MS2 may connect the second inductor L2 with the third output terminal Nout3.

Referring to FIG. 12, a power supply system 100 of an aircraft may include an auxiliary battery device 20, a converter device 30, a first battery device 51, and a second battery device 52.

The auxiliary battery device 20 may include an auxiliary battery 20B and a circuit device for controlling a timing when a voltage of the auxiliary battery 20B is output to a first output terminal Nout1.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the fifth switching device (Q9 and Q10) and a fifth inductor L5. The sixth half-bridge converter may include the sixth switching device (Q11 and Q12) and a sixth inductor L6.

A mode switch device 33 may include a first mode switch MS1 and a second mode switch MS2.

The first mode switch MS1 may be a single pole double throw (SPDT) relay which connects the first inductor L1 with a cathode of a rectifier diode D11 or a second output terminal Nout2. The second mode switch MS2 may be a single pole double throw (SPDT) relay which connects the second inductor L2 with the cathode of the rectifier diode D11 or a third output terminal Nout3.

The first battery device 51 may include a first battery 51B and a circuit device for controlling a timing when a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The second battery device 52 may include a second battery 52B and a circuit device for controlling a timing when a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The operation of the mode switch device 33 in the example shown in FIG. 12 may switch according to the same procedure as those shown in FIGS. 7 to 11.

A further description will be provided for a driving mode with respect to FIG. 12.

In a first mode, a processor 60 may control the first mode switch MS1 such that the first inductor L1 is connected with an output node Ns of a fuel cell 10. The processor 60 may control the second mode switch MS2 such that the second inductor L2 is connected with the output node Ns of the fuel cell 10.

Thus, a converter device 30 may supply power generated by the fuel cell 10 to a first motor device 210 through the first output terminal Nout1. The first battery device 51 may supply a voltage of the first battery 51B to a second motor device 220 through the second output terminal Nout2, and the second battery device 52 may supply a voltage of the second battery 52B to a third motor device 230 through the third output terminal Nout3.

In a second mode, the processor 60 may control the first mode switch MS1 such that the first inductor L1 is connected with the second output terminal Nout2. At the same time, the processor 60 may disconnect the first inductor L1 from the output node Ns of the fuel cell 10. Thus, the first inductor L1, the first converter switch Q1, and the second converter switch Q2 may perform a function of a buck converter which supplies a second link voltage $V_{C2}$ to the second output terminal Nout2.

In the second mode, the processor 60 may control the second mode switch MS2 such that the second inductor L2 is connected with the third output terminal Nout3. At the same time, the processor 60 may disconnect the second inductor L2 from the output node Ns of the fuel cell 10. Thus, the second inductor L2, the third converter switch Q3, and the fourth converter switch Q4 may perform a function of a buck converter which supplies the second link voltage to the third output terminal Nout3.

Thus, in the second mode, the converter device 30 may distribute the voltage of the first output terminal Nout1 to the second output terminal Nout2 and the third output terminal Nout3.

The first and second battery devices 51 and 52 shown in FIG. 12 may be applicable to the example shown in FIG. 4 (e.g., by eliminating the battery device 52). In other words, in the first battery device 51 shown in the example of FIG. 4, a first auxiliary converter switch QC and a second auxiliary converter switch QD may be omitted and the second output terminal Nout2 may be connected with the first inductor L1 through the first mode switch MS1.

Figure 13:
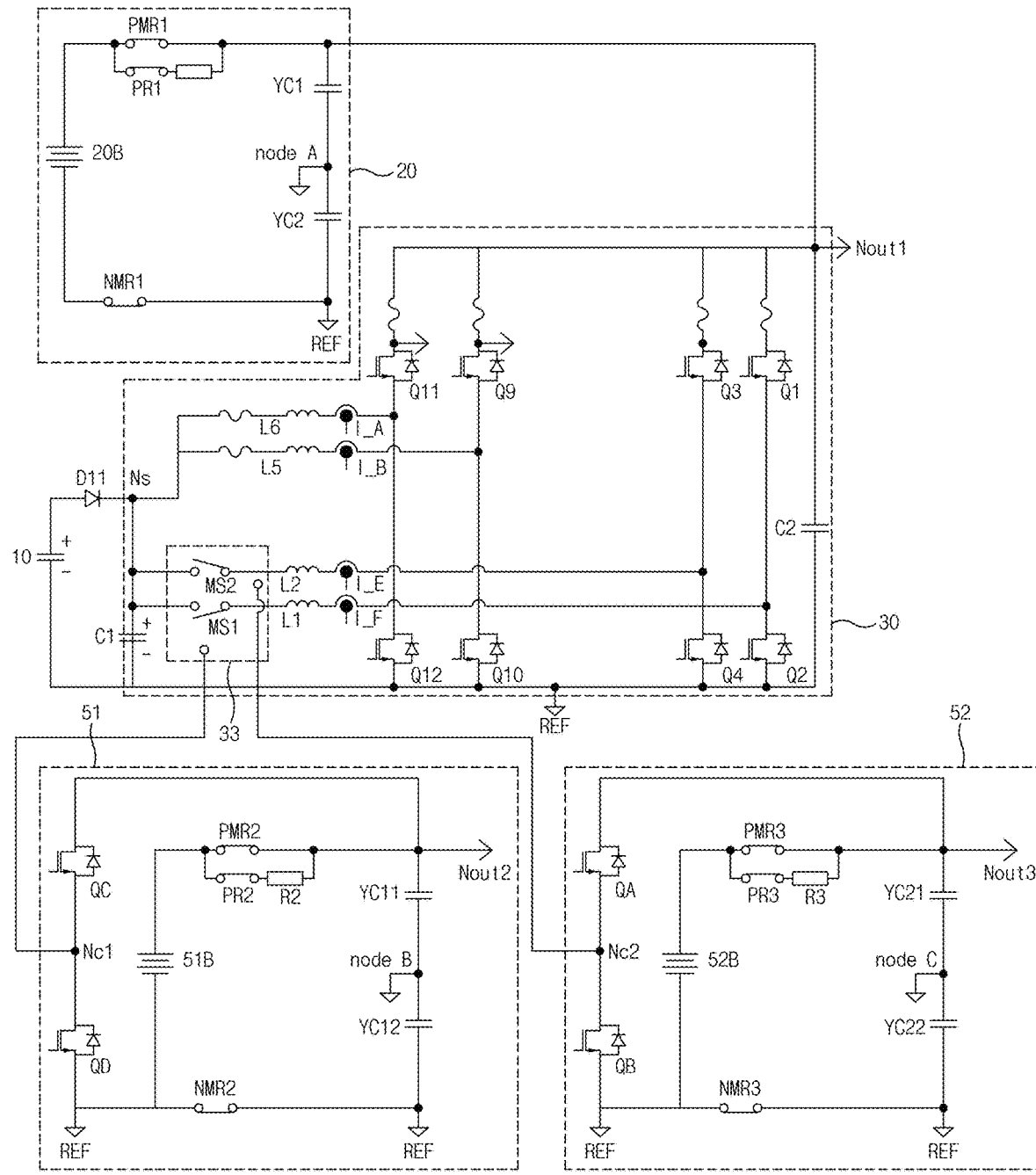
FIG. 13 is a circuit diagram illustrating a power supply system.

FIG. 13 is a circuit diagram illustrating a power supply system. FIG. 13 may be a circuit diagram illustrating an example of a power supply system shown in FIG. 3. A detailed description of substantially the same configuration described above will be omitted. Unlike the above figures, FIG. 13 has fewer switches in the converter device 30.

Referring to FIG. 13, a power supply system 100 of an aircraft may include an auxiliary battery device 20, a converter device 30, a first battery device 51, and a second battery device 52.

The auxiliary battery device 20 may include an auxiliary battery 20B and a circuit device for controlling a timing when a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first and second half-bridge converters, fifth and sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The fifth half-bridge converter may include a fifth switching device (Q9 and Q10) and a fifth inductor L5. The sixth half-bridge converter may include a sixth switching device (Q11 and Q12) and a sixth inductor L6.

The first and second switching devices and the fifth and sixth switching devices may alternately switch a voltage passing through a rectifier diode D11 from a fuel cell 10.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a node between a first auxiliary converter switch QC and a second auxiliary converter switch QD. The second mode switch MS2 may be a single pole double throw (SPDT) relay which connects the second inductor L2 with the cathode of the rectifier diode D11 or a node between a third auxiliary converter switch QA and a fourth auxiliary converter switch QB.

The first battery device 51 may include a first auxiliary converter device, a first battery 51B, and a circuit device for controlling a timing when a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The second battery device 52 may include a second auxiliary converter device, a second battery 52B, and a circuit device for controlling a timing when a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The operation of the mode switch device 33 in the example shown in FIG. 13 may switch according to the same procedure as those shown in FIGS. 7 to 11.

A further description will be provided for a driving mode in the example shown in FIG. 13.

In a first mode, a processor 60 may control the first mode switch MS1 such that the first inductor L1 is connected with an output node Ns of the fuel cell 10. The processor 60 may control the second mode switch MS2 such that the second inductor L2 is connected with the output node Ns of the fuel cell 10. Thus, a converter device 30 may supply power generated by the fuel cell 10 to a first motor device 210 through the first output terminal Nout1. The first battery device 51 may supply a voltage of the first battery 51B to a second motor device 220 through the second output terminal Nout2, and the second battery device 52 may supply a voltage of the second battery 52B to a third motor device 230 through the third output terminal Nout3.

In a second mode, the processor 60 may control the first mode switch MS1 such that the first inductor L1 is connected with the second output terminal Nout2. At the same time, the processor 60 may disconnect the first inductor L1 from the output node Ns of the fuel cell 10. Thus, the first inductor L1, a first converter switch Q1, a second converter switch Q2, a first auxiliary converter switch QC, and a second auxiliary converter switch QD may form an H bridge converter and may supply a voltage of the first output terminal Nout1 to the second output terminal Nout2.

Likewise, in the second mode, the processor 60 may control the second mode switch MS2 such that the second inductor L2 is connected with the third output terminal Nout3. At the same time, the processor 60 may disconnect the second inductor L2 from the output node Ns of the fuel cell 10. Thus, the second inductor L2, a third converter switch Q3, a fourth converter switch Q4, a third auxiliary converter switch QA, and a fourth auxiliary converter switch QB may form an H bridge converter and may supply a voltage of the first output terminal Nout1 to the third output terminal Nout3.

The converter shown in FIG. 13 is applicable to the example shown in FIG. 4 (e.g., by replacing the switch circuit of the converter device 30 of FIG. 4 with the switch circuit of the converter device 30 of FIG. 13).

Figure 14:
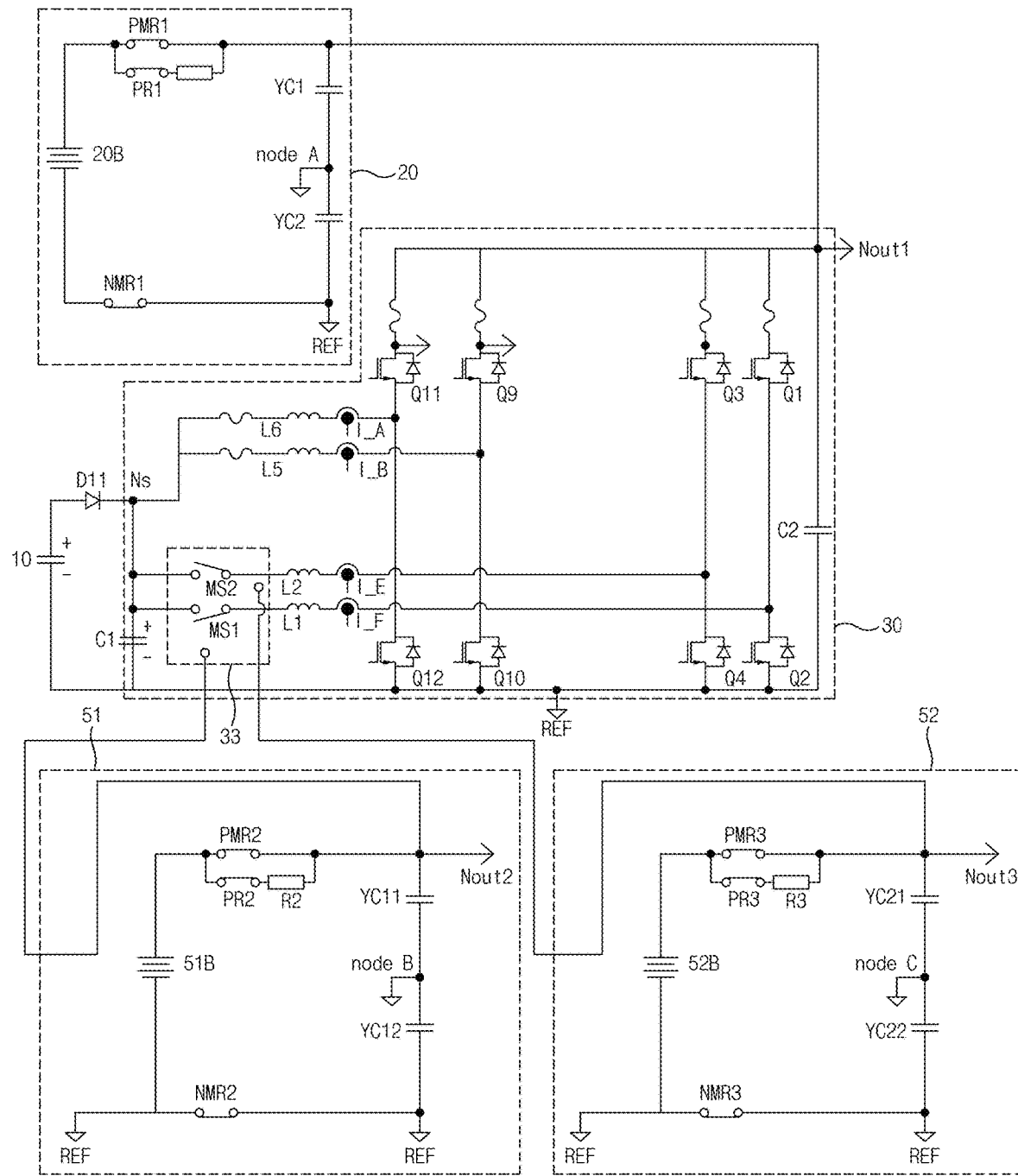
FIG. 14 is a circuit diagram illustrating a power supply system.

FIG. 14 is a circuit diagram illustrating a power supply system. FIG. 14 may be a circuit diagram illustrating an example of a power supply system shown in FIG. 3. A detailed description of substantially the same configuration described above will be omitted.

Referring to FIG. 14, a power supply system 100 of an aircraft may include an auxiliary battery device 20, a converter device 30, a first battery device 51, and a second battery device 52.

The auxiliary battery device 20 may include an auxiliary battery 20B and a circuit device for controlling a timing when a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first and second half-bridge converters, fifth and sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The fifth half-bridge converter may include the fifth switching device (Q9 and Q10) and a fifth inductor L5. The sixth half-bridge converter may include the sixth switching device (Q11 and Q12) and a sixth inductor L6.

The first and second switching devices and the fifth and sixth switching devices may alternately switch a voltage passing through a rectifier diode D11 from a fuel cell 10.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a second output terminal Nout2. The second mode switch MS2 may be a single pole double throw (SPDT) relay which connects the second inductor L2 with the cathode of the rectifier diode D11 or a third output terminal Nout3.

The first battery device 51 may include a first battery 51B and a circuit device for controlling a timing when a voltage of the first battery 51B is output to the second output terminal Nout2.

The second battery device 52 may include a second battery 52B and a circuit device for controlling a timing when a voltage of the second battery 52B is output to the third output terminal Nout3.

The control method of the power supply system shown in FIG. 14 may include the same procedure as a control method of a power supply system shown in FIG. 12.

Figure 15:
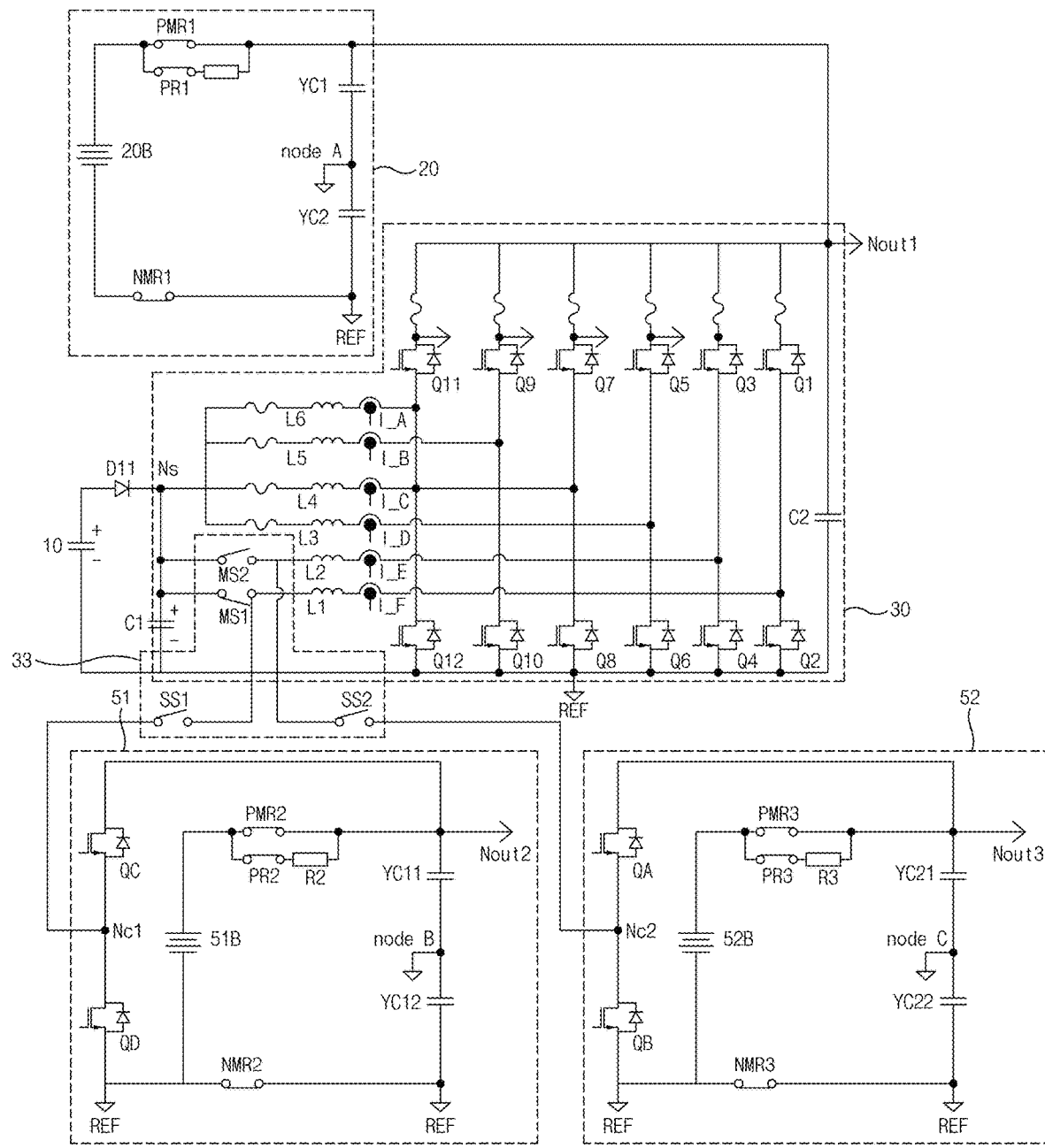
FIG. 15 is a circuit diagram illustrating a power supply system.
Figure 16:
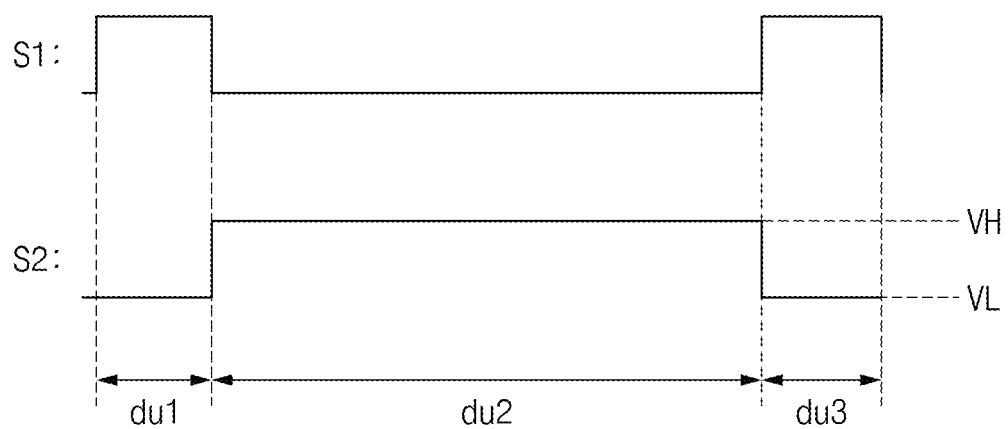
FIG. 16 is a drawing illustrating an operation timing of a control signal for controlling a mode switch device.

FIG. 15 is a circuit diagram illustrating a power supply system. FIG. 16 is a diagram illustrating an operation timing of a control signal for controlling a mode switch device. FIG. 15 may be a circuit diagram illustrating an example of a power supply system shown in FIG. 3. A detailed description of substantially the same configuration described above will be omitted. In FIG. 15, the circuit may further include a first auxiliary mode switch SS1, and a second auxiliary mode switch SS2 (e.g., in comparison with FIG. 5), and the first mode switch MS1 and the second mode switch MS2 may be differently configured (e.g., in comparison with FIG. 5).

Referring to FIGS. 15 and 16, a power supply system 100 of an aircraft may include an auxiliary battery device 20, a converter device 30, a first battery device 51, and a second battery device 52.

The converter device 30 may include first to sixth half-bridge converters. For example, the first half-bridge converter may include a first switching device (Q1 and Q2) and a first inductor L1.

A mode switch device 33 may include a first mode switch MS1, a second mode switch MS2, a first auxiliary mode switch SS1, and a second auxiliary mode switch SS2.

The first mode switch MS1 may be switched by a first control signal S1 and may switch a connection between a first inductor L1 and a cathode of a rectifier diode D11.

The first auxiliary mode switch SS1 may be switched by a second control signal S2 and may switch a connection between the first inductor L1 and a node between a first auxiliary converter switch QC and a second auxiliary converter switch QD.

The first mode switch MS1 and the first auxiliary mode switch SS1 may operate complementary to each other. In other words, in a duration where the first mode switch MS1 is closed, the first auxiliary mode switch SS1 may be opened. In a duration where the first mode switch MS1 is opened, the first auxiliary mode switch SS1 may be closed.

The second mode switch MS2 may be switched by the first control signal S1 and may switch a connection between a second inductor L2 and the cathode of the rectifier diode D11.

The second auxiliary mode switch SS2 may be switched by the second control signal S2 and may switch a connection between the second inductor L2 and a node between a third auxiliary converter switch QA and a fourth auxiliary converter switch QB.

The second mode switch MS2 and the second auxiliary mode switch SS2 may operate complementary to each other. In other words, in a duration where the second mode switch MS2 is closed, the second auxiliary mode switch SS2 be opened. In a duration where the second mode switch MS2 is opened, the second auxiliary mode switch SS2 may be closed.

In a take-off duration du1 and a landing duration du3, the first mode switch MS1 may be closed by the first control signal S1, and the first auxiliary mode switch SS1 may be opened by the second control signal S2. In the take-off duration du1 and the landing duration du3, the second mode switch MS2 may be closed by the first control signal S1, and the second auxiliary mode switch SS2 may be opened by the second control signal S2.

Thus, in the take-off duration du1 and the landing duration du3, the converter device 30 may boost and supply a voltage generated by a fuel cell 10 to the first output terminal Nout1.

In a cruising duration du2, the first mode switch MS1 may be opened by the first control signal S1, and the first auxiliary mode switch SS1 may be closed by the second control signal S2. In the cruising duration du2, the second mode switch MS2 may be opened by the first control signal S1, and the second auxiliary mode switch SS2 may be closed by the second control signal S2.

Thus, in the cruising duration du2, a first converter switch Q1, a second converter switch Q2, the first inductor L1, a first auxiliary converter switch QC, and a second auxiliary converter switch QD may form a first H bridge converter. The voltage of the first output terminal Nout1 may be supplied to a first battery 51B using the first H bridge converter.

Likewise, a third converter switch Q3, a fourth converter switch Q4, the second inductor L2, a third auxiliary converter switch QA, and a fourth auxiliary converter switch QB may form a second H bridge converter. The voltage of the first output terminal Nout1 may be supplied to a second battery 52B using the second H bridge converter.

Figure 17:
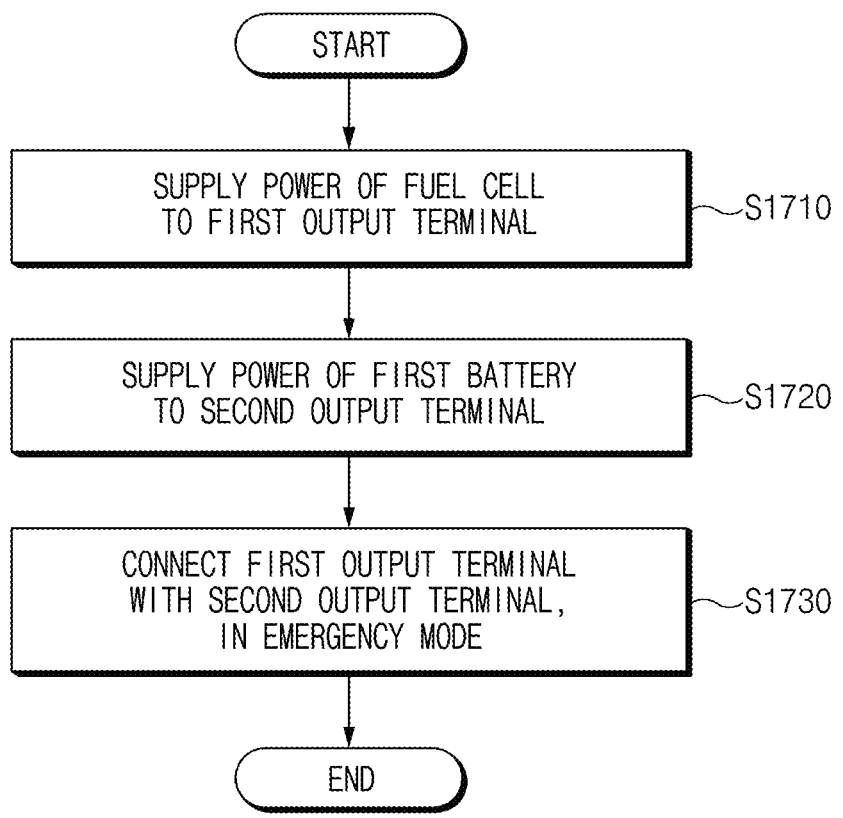
FIG. 17 is a flowchart illustrating a control method of a power supply system of an aircraft.

FIG. 17 is a flowchart illustrating a control method of a power supply system of an aircraft. Particularly, FIG. 17 is a flowchart for describing a control method for addressing an error in a power supply system of an aircraft. A procedure shown in FIG. 17 may be procedures controlled by a processor.

A description will be provided for a control method of a power supply system of an aircraft with reference to FIG. 17.

In S1710, a processor 60 may supply power of a fuel cell 10 to a first motor device 210 through a first output terminal Nout1.

If the aircraft is in a take-off duration or a landing duration, the processor 60 may control a first mode switch MS1 such that an output node Ns of the fuel cell 10 and a first inductor L1 are connected with each other. If the aircraft is in the take-off duration or the landing duration, the processor 60 may control a second mode switch MS2 such that the output node Ns of the fuel cell 10 and the second inductor L2 are connected with each other.

As the first inductor L1 and the output node Ns of the fuel cell 10 are connected with each other, a first half-bridge converter including a first converter switch Q1, a second converter switch Q2, and a fourth inductor L1 may boost and supply a voltage generated by the fuel cell 10 to the first output terminal Nout1.

As the second inductor L2 and the output node Ns of the fuel cell 10 are connected with each other, a second half-bridge converter including a third converter switch Q3, fourth converter switch Q4, and a second inductor L2 may boost and supply the voltage generated by the fuel cell 10 to the first output terminal Nout1.

If the aircraft is in a cruising duration, the processor 60 may control the first mode switch MS1 such that the first inductor L1 is connected with a second output terminal Nout2 and may control the second mode switch MS2 such that the second inductor L2 is connected with a third output terminal Nout3.

In S1720, the processor 60 may supply a voltage of a battery device 51 to a second motor device 220 through the second output terminal Nout2.

If the aircraft is in the take-off duration or the landing duration, the first battery device 51 may not be electrically connected with a converter device 30, and the processor 60 may supply the voltage of the first battery 51B to the second output terminal Nout2.

If the aircraft is in the cruising duration, the first output terminal Nout1 may be electrically connected with the second output terminal Nout2, and the first battery 51B may be charged by receiving power from the first output terminal Nout1.

In S1730, If an error and/or a failure is detected in the converter device 30 or the first battery device 51, the processor 60 may enter into an emergency mode to supply a voltage of the first output terminal Nout1 to the second output terminal Nout2 or supply a voltage of the second output terminal Nout2 to the first output terminal Nout1.

The emergency mode may first proceed irrespective of an operation mode of the aircraft (e.g., one or more operations in the emergency mode may override one or more operations of a normal operation mode of the aircraft).

In the emergency mode, the processor 60 may control the first mode switch MS1 such that the first inductor L1 and the second output terminal Nout2 are connected with each other. Thus, a node Nc1 between a first auxiliary converter switch QC and a second auxiliary converter switch OD may be connected with the first inductor L1.

In the emergency mode, the processor 60 may control the second mode switch MS2 such that the second inductor L2 and the third output terminal Nout3 are connected with each other. Thus, a node Nc2 between a third auxiliary converter switch QA and a fourth auxiliary converter switch QB may be connected with the second inductor L2.

The emergency mode may be classified as a first emergency mode in which an error occurs in the fuel cell 10, a second emergency mode in which an error occurs in the first battery device 51, or a third emergency mode in which an error occurs in a second battery device 52. The emergency mode may include a fourth emergency mode in which an error in the fuel cell 10 and an error in at least one of the first battery device 51 or the second battery device 52 are detected. The error in the fuel cell may be that an abnormal short or open phenomenon between the fuel cell 10 and the converter device 30 is detected. The error 10 in the first battery device 51 or the second battery device 52 may be that an abnormal short or open phenomenon between the first battery 51B and a circuit device is detected or that an abnormal short or open phenomenon between a second battery 52B and a circuit device is detected.

The processor 60 may calculate a required voltage of the first output terminal Nout1 in the first emergency mode. The required voltage of the first output terminal Nout1 may be a required voltage for operating the first motor device 210.

If the required voltage of the first output terminal Nout1 is greater than the voltage of the first battery 51B (e.g., the voltage across the first battery 51B), the processor 60 may adjust a duty ratio of the first converter switch Q1 and the second converter switch Q2 and may supply power from the second output terminal Nout2 to the first output terminal Nout1.

If the required voltage of the first output terminal Nout1 is less than the voltage of the first battery 51B, the processor 60 may adjust a duty ratio of the first auxiliary converter switch QC and the second auxiliary converter switch QD and may supply power from the second output terminal Nout2 to the first output terminal Nout1.

The processor 60 may calculate a required voltage of the second output terminal Nout2 in the second emergency mode. The required voltage of the second output terminal Nout2 may be a required voltage for operating the second motor device 220.

If the required voltage of the second output terminal Nout2 is greater than the voltage of the fuel cell 10, the processor 60 may adjust a duty ratio of the first auxiliary converter switch QC and the second auxiliary converter switch QD and may supply power from the first output terminal Nout1 to the second output terminal Nout2.

If the required voltage of the second output terminal Nout2 is less than the voltage of the fuel cell 10, the processor 60 may adjust a duty ratio of the first converter switch Q1 and the second converter switch Q2 and may supply power from the first output terminal Nout1 to the second output terminal Nout2.

Hereinafter, a description will be provided in detail for an operation of the emergency mode with reference to FIGS. 19 to 25. The example shown in FIGS. 19 to 25 is illustrated as a configuration including the first battery device and the second battery device, but the number of batteries are not limited thereto.

Figure 18:
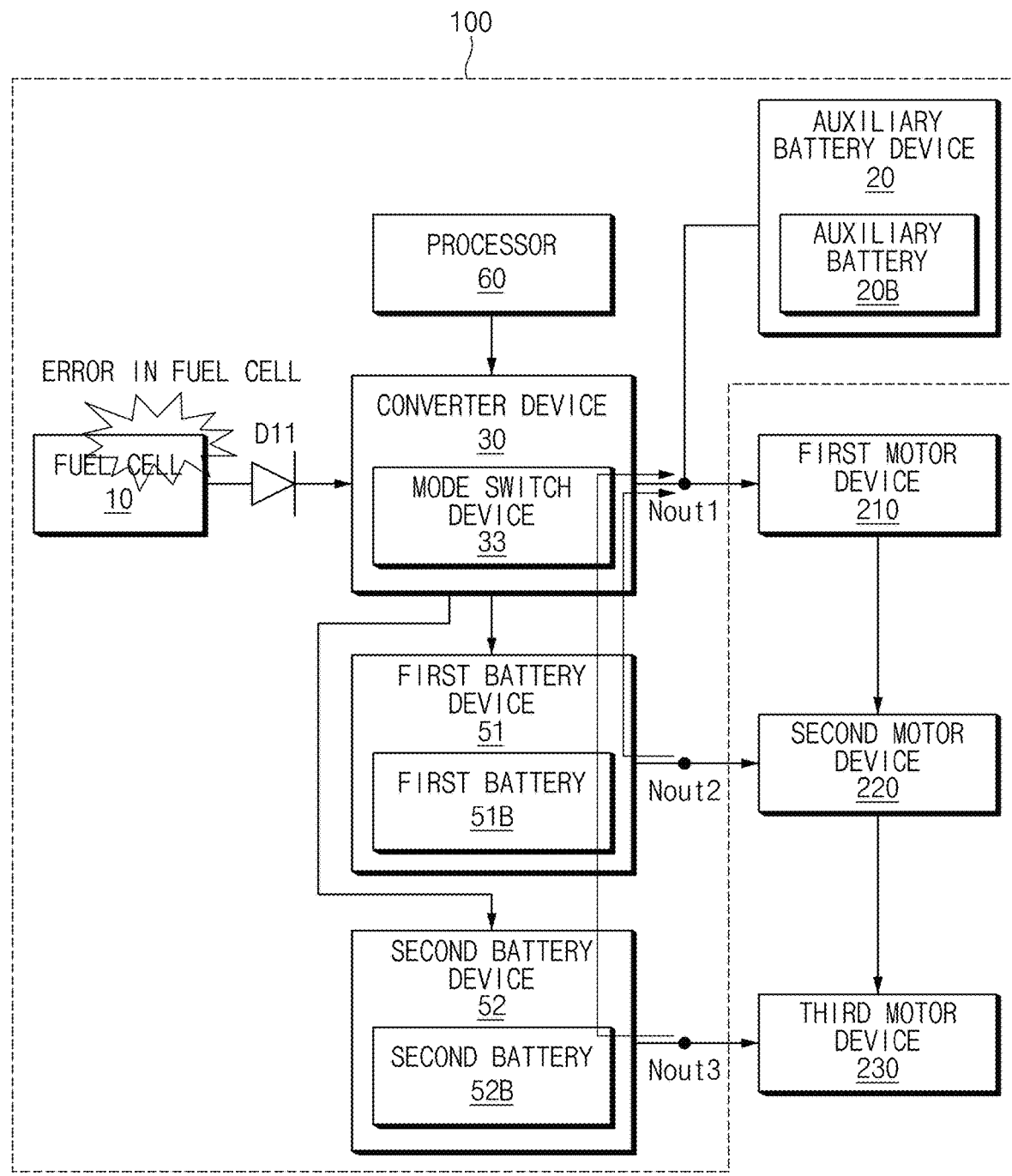
FIG. 18 is a drawing for schematically describing a power supply path of a first emergency mode.
Figure 19:
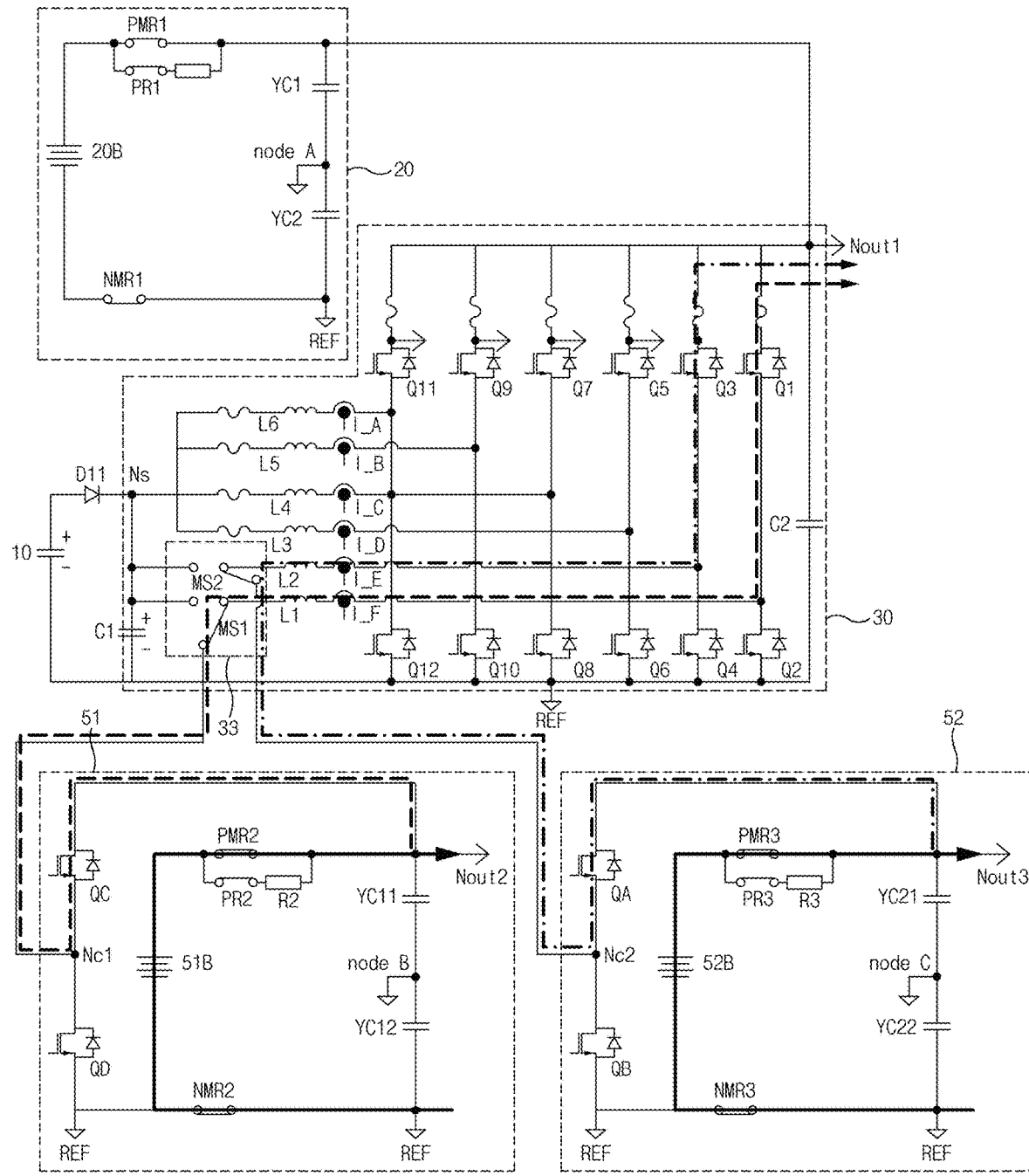
FIG. 19 is a drawing for describing an operation of a circuit diagram in a first emergency mode.

FIGS. 18 and 19 are diagrams for describing an operation of a first emergency mode. FIG. 18 is a diagram for schematically describing a power supply path of a first emergency mode. FIG. 19 is a diagram for describing an operation of a circuit diagram in a first emergency mode.

Referring to FIGS. 18 and 19, a processor 60 may charge a first output terminal Nout1 using a voltage of a second output terminal Nout2 in the first emergency mode.

To this end, the processor 60 may output a first control signal S1 as a low-level voltage VL. A first mode switch MS1 may connect a first inductor L1 with a node Nc1 between a first auxiliary converter switch QC and a second auxiliary converter switch QD by the first control signal S1 of the low-level voltage VL. At the same time, the first inductor L1 and an output node Ns of a fuel cell 10 may be disconnected from each other by the first control signal S1 of the low-level voltage VL.

The processor 60 may compare a required voltage of the first output terminal Nout1 with a voltage of a first battery 51B.

If the required voltage of the first output terminal Nout1 is greater than the voltage of the first battery 51B, the processor 60 may keep the first auxiliary converter switch QC turned on and may keep the second auxiliary converter switch QD turned off. At the same time, the processor 60 may alternately turn on the first converter switch Q1 and the second converter switch Q2 and may boost and supply the voltage of the second output terminal Nout2 to the first output terminal Nout1.

The magnitude of a voltage charged in the first output terminal Nout1 by the duty ratio of the first converter switch Q1 and the second converter switch Q2 may be represented as Equation 4 below.

$$Vc2 = \frac{Vbat1}{1-D4} \qquad \text{[Equation 4]}$$

In Equation 4 above, Vc2 may refer to the required voltage of the first output terminal Nout1 and Vbat1 may refer to the voltage of the first battery 51B. D4 may refer to the turn-on duty ratio of the second converter switch Q2.

If the required voltage of the first output terminal Nout1 is less than the voltage of the first battery 51B, the processor 60 may keep the first converter switch Q1 turned on and may keep the second converter switch Q2 turned off. At the same time, the processor 60 may alternately turn on the first auxiliary converter switch QC and the second auxiliary converter switch QD and may supply the voltage of the second output terminal Nout2 to the first output terminal Nout1.

The magnitude of a voltage charged in the first output terminal Nout1 by the duty ratio of the first auxiliary converter switch QC and the second auxiliary converter switch QD may be represented as Equation 5 below.

$$Vc2 = Vbat1 \times D5 \qquad \text{[Equation 5]}$$

In Equation 5 above, D5 may be the turn-on duty ratio of the first auxiliary converter switch QC.

The processor 60 may charge the first output terminal Nout1 using power of a third output terminal Nout3.

To this end, the processor 60 may output a first control signal S1 as a low-level voltage VL. A second mode switch MS2 may connect a node Nc2 between a third auxiliary converter switch QA and a fourth auxiliary converter switch QB with a second inductor L2 based on the first control signal S1 of the low-level voltage VL. At the same time, the second inductor L2 and an output node Ns of a fuel cell 10 may be disconnected from each other by the first control signal S1 of the low-level voltage VL.

The processor 60 may compare the required voltage of the first output terminal Nout1 with a voltage of a second battery 52B.

If the required voltage of the first output terminal Nout1 is greater than the voltage of the second battery 52B, the processor 60 may keep the third auxiliary converter switch QA turned on and may keep the fourth auxiliary converter switch QB turned off. At the same time, the processor 60 may alternately turn on the third converter switch Q3 and the fourth converter switch Q4 and may boost and supply the voltage of the third output terminal Nout3 to the first output terminal Nout1.

The magnitude of a voltage charged in the first output terminal Nout1 by the duty ratio of the third converter switch Q3 and the fourth converter switch Q4 may be represented as Equation 6 below.

$$Vc2 = \frac{Vbat2}{1 - D6} \qquad \text{[Equation 6]}$$

In Equation 6 above, Vbat2 may refer to the voltage of the second battery 52B, and D6 may refer to the turn-on duty ratio of the fourth converter switch Q4.

If the required voltage of the first output terminal Nout1 is less than the voltage of the second battery 52B, the processor 60 may keep the third converter switch Q3 turned on and may keep the fourth converter switch Q4 turned off. At the same time, the processor 60 may alternately turn on the third auxiliary converter switch QA and the fourth auxiliary converter switch QB and may supply the voltage of the third output terminal Nout3 to the first output terminal Nout1.

The magnitude of a voltage charged in the first output terminal Nout1 by the duty ratio of the third auxiliary converter switch QA and the fourth auxiliary converter switch QB may be represented as Equation 7 below.

$$Vc2 = Vbat2 \times D7 \qquad \text{[Equation 7]}$$

In Equation 7 above, D7 may be the turn-on duty ratio of the third auxiliary converter switch QA.

Figure 20:
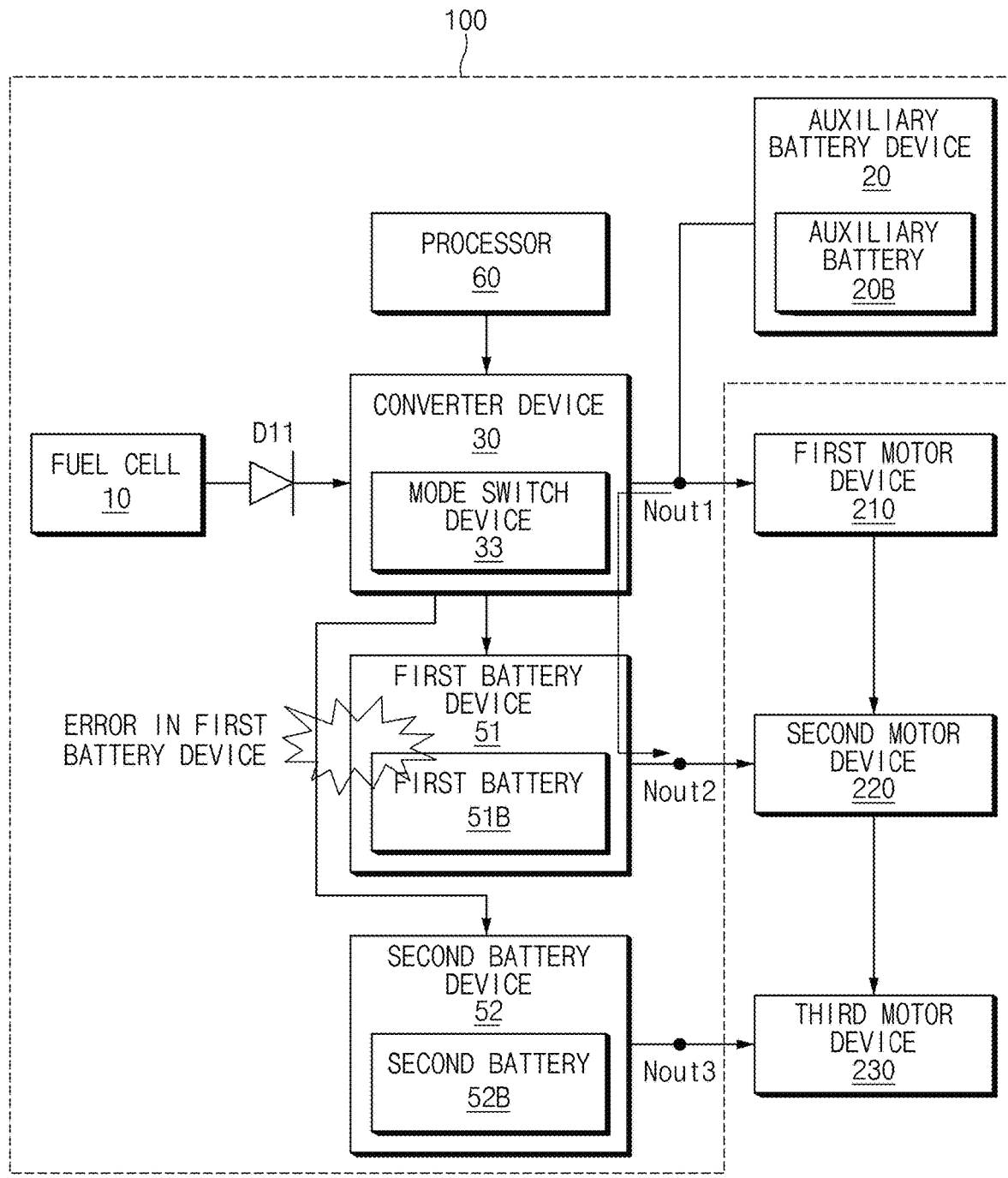
FIG. 20 is a drawing for schematically describing a power supply path of a second emergency mode.
Figure 21:
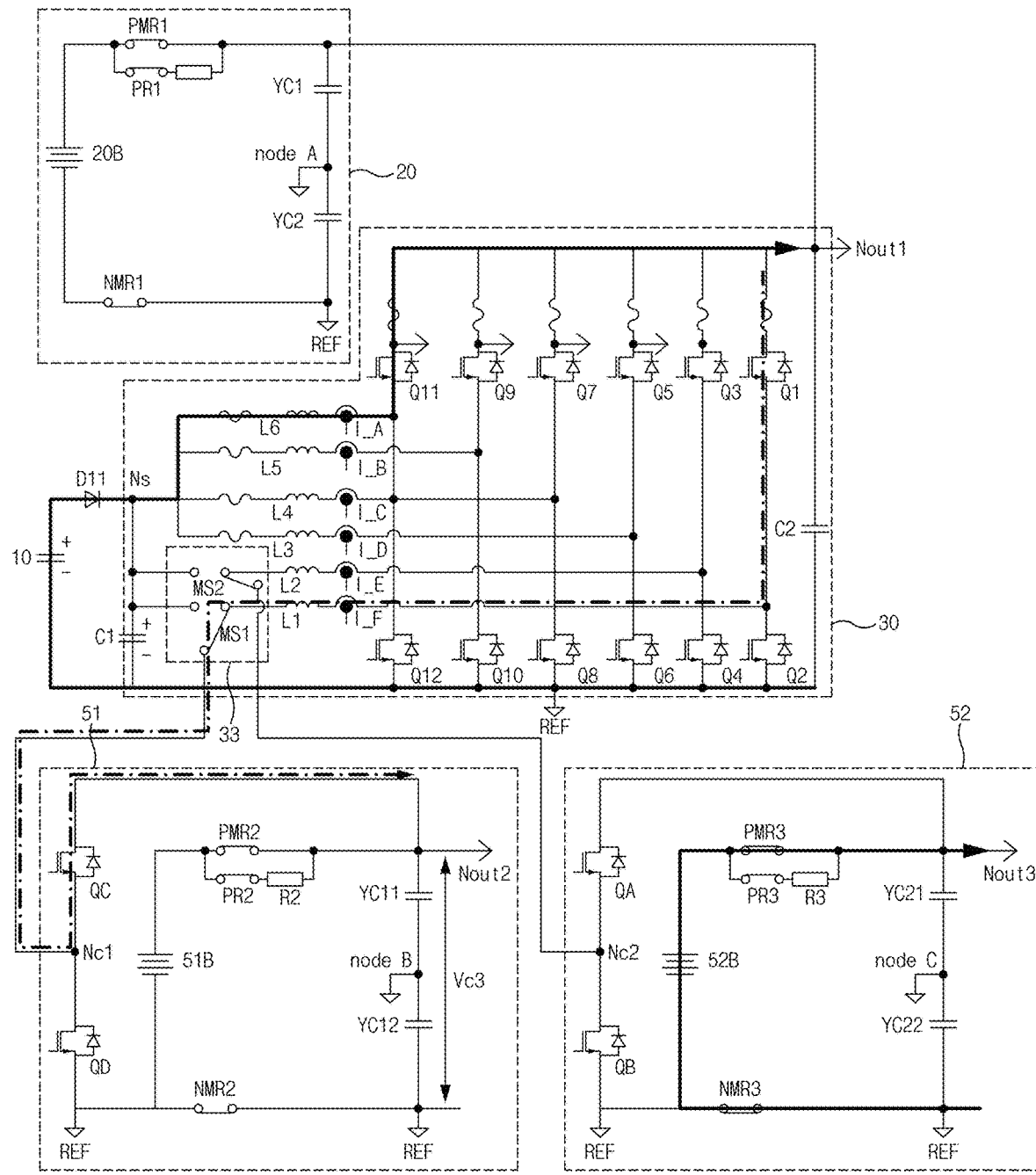
FIG. 21 is a drawing for describing an operation of a circuit diagram in a second emergency mode.

FIGS. 20 and 21 are diagrams for describing an operation of a second emergency mode. FIG. 20 is a diagram for schematically describing a power supply path of a second emergency mode. FIG. 21 is a diagram for describing an operation of a circuit diagram in a second emergency mode.

Referring to FIGS. 20 and 21, a processor 60 may charge a second output terminal Nout2 using a voltage of a first output terminal Nout1 in the second emergency mode.

To this end, the processor 60 may output a first control signal S1 as a low-level voltage VL. A first mode switch MS1 may connect a first inductor L1 with a node Nc1 between a first auxiliary converter switch QC and a second auxiliary converter switch QD by the first control signal S1 of the low-level voltage VL. At the same time, the first inductor L1 and an output node Ns of a fuel cell 10 may be disconnected from each other by the first control signal S1 of the low-level voltage VL.

The processor 60 may compare a required voltage of the second output terminal Nout2 with a voltage of the first output terminal Nout1.

If the required voltage of the second output terminal Nout2 is greater than the voltage of the first output terminal Nout1, the processor 60 may keep a first converter switch Q1 turned on and may keep the second converter switch Q2 turned off. At the same time, the processor 60 may alternately turn on the first auxiliary converter switch QC and the second auxiliary converter switch QD and may supply the voltage of the first output terminal Nout1 to the second output terminal Nout2.

The magnitude of a voltage charged in the second output terminal Nout2 by the duty ratio of the first auxiliary converter switch QC and the second auxiliary converter switch QD may be represented as Equation 8 below.

$$Vc3 = \frac{Vc2}{1 - D8} \qquad \text{[Equation 8]}$$

In Equation 8 above, Vc3 may refer to the required voltage of the second output terminal Nout2. Vc2 may refer to the voltage of the first output terminal Nout1. If the fuel cell 10 is in a normal state, Vc2 may be the same magnitude as the required voltage of the first output terminal Nout1. D8 may refer to the turn-on duty ratio of the second auxiliary converter switch QD.

If the required voltage of the second output terminal Nout2 is less than the voltage of the first output terminal Nout1, the processor 60 may keep the first auxiliary converter switch QC turned on and may keep the second auxiliary converter switch QD turned off. At the same time, the processor 60 may alternately turn on the first converter switch Q1 and the second converter switch Q2 and may supply the voltage of the first output terminal Nout1 to the second output terminal Nout2.

The magnitude of a voltage charged in the second output terminal Nout2 by the duty ratio of the first converter switch Q1 and the second converter switch Q2 may be represented as Equation 9 below.

$$Vc3 = Vc2 \times D9 \qquad \text{[Equation 9]}$$

In Equation 9 above, D9 may be the turn-on duty ratio of the first converter switch Q1.

Figure 22:
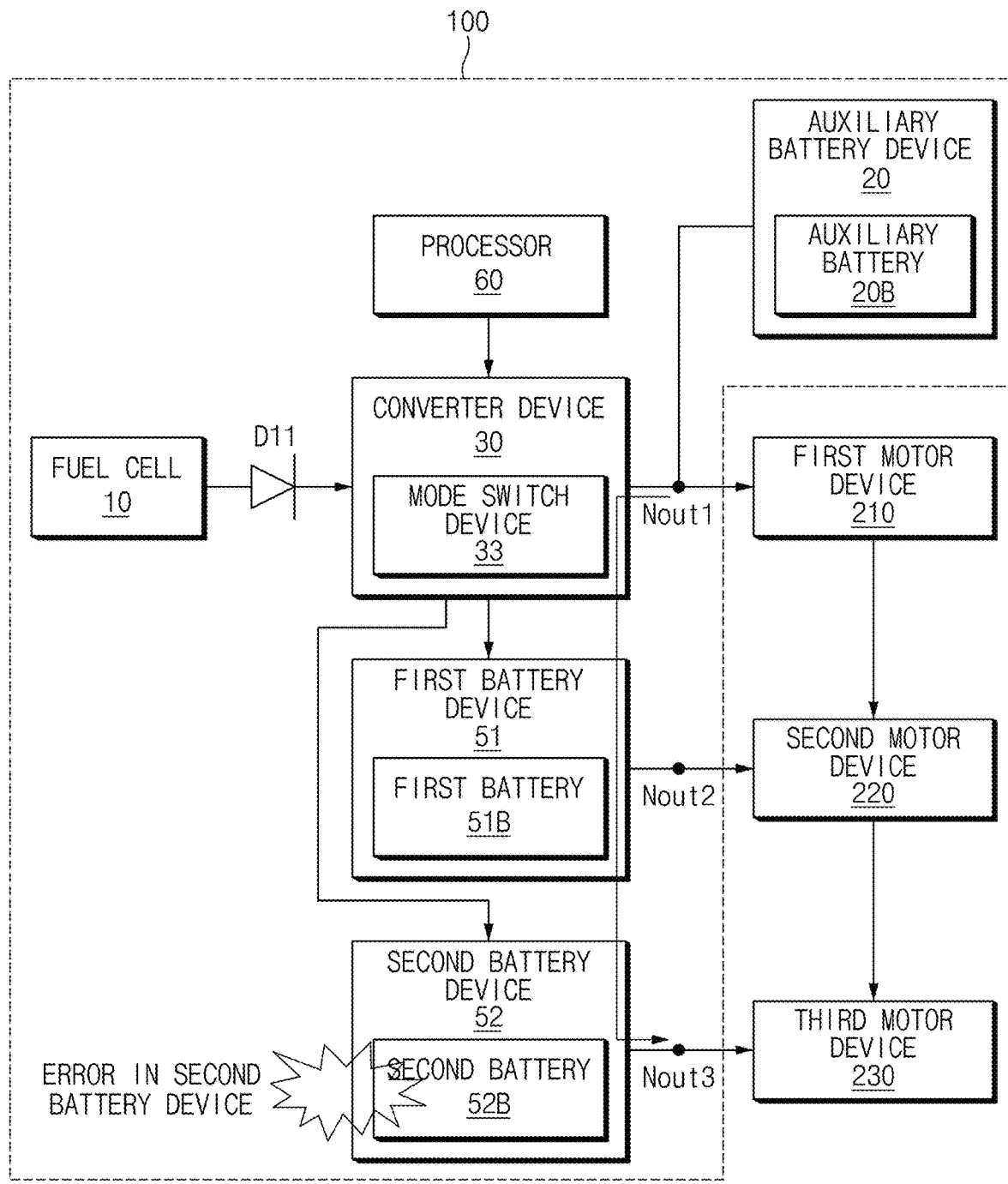
FIG. 22 is a drawing for schematically describing a power supply path of a third emergency mode.
Figure 23:
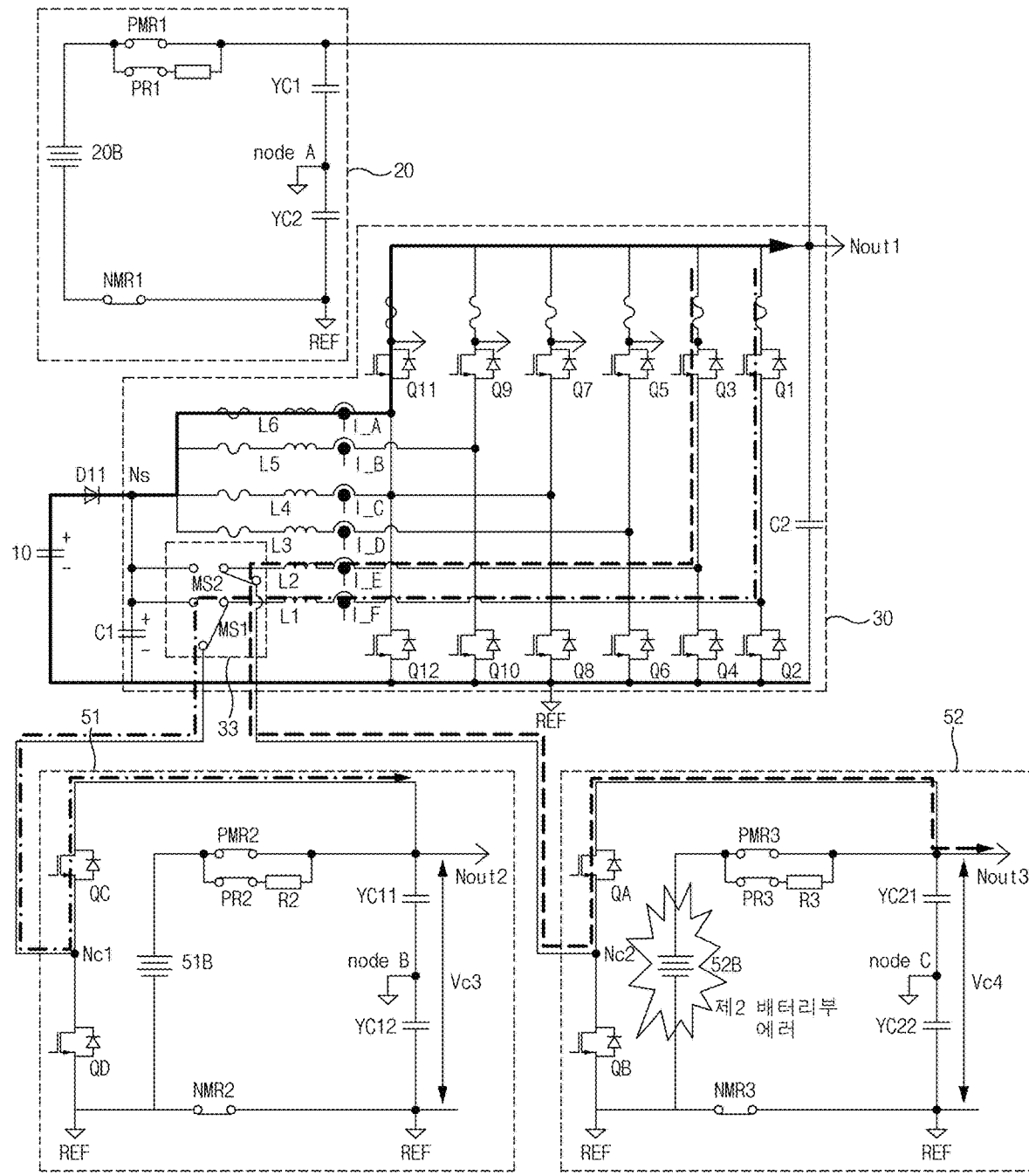
FIG. 23 is a drawing for describing an operation of a circuit diagram in a third emergency mode.

FIGS. 22 and 23 are diagrams for describing an operation of a third emergency mode. FIG. 22 is a diagram for schematically describing a power supply path of a third emergency mode. FIG. 23 is a diagram for describing an operation of a circuit diagram in a third emergency mode.

Referring to FIGS. 22 and 23, a processor 60 may charge a third output terminal Nout3 using a voltage of a first output terminal Nout1 in the third emergency mode.

To this end, the processor 60 may output a first control signal S1 as a low-level voltage VL. A second mode switch MS2 may connect a node Nc2 between a third auxiliary converter switch QA and a fourth auxiliary converter switch QB with a second inductor L2 based on the first control signal S1 of the low-level voltage VL. At the same time, the second inductor L2 and an output node Ns of a fuel cell 10 may be disconnected from each other by the first control signal S1 of the low-level voltage VL.

The processor 60 may compare a required voltage of the third output terminal Nout3 with a voltage of the first output terminal Nout1.

If the required voltage of the third output terminal Nout3 is greater than the voltage of the first output terminal Nout1, the processor 60 may keep a third converter switch Q3 turned on and may keep a fourth converter switch Q4 turned off. At the same time, the processor 60 may alternately turn on the third auxiliary converter switch QA and the fourth auxiliary converter switch QB and may boost and supply the voltage of the first output terminal Nout1 to the third output terminal Nout3.

The magnitude of a voltage charged in the third output terminal Nout3 by the duty ratio of the third auxiliary converter switch QA and the fourth auxiliary converter switch QB may be represented as Equation 10 below.

$$Vc4 = \frac{Vc2}{1 - D10} \qquad \text{[Equation 10]}$$

In Equation 10 above, Vc4 may refer to the required voltage of the third output terminal Nout3. Vc2 may refer to the voltage of the first output terminal Nout1. If the fuel cell 10 is in a normal state, Vc2 may be the same magnitude as the required voltage of the first output terminal Nout1. D10 may refer to the turn-on duty ratio of the fourth auxiliary converter switch QB.

If the required voltage of the third output terminal Nout3 is less than the voltage of the first output terminal Nout1, the processor 60 may keep the third auxiliary converter switch QA turned on and may keep the fourth auxiliary converter switch QB turned off. At the same time, the processor 60 may alternately turn on the third converter switch Q3 and the fourth converter switch Q4 and may supply the voltage of the first output terminal Nout1 to the third output terminal Nout3.

The magnitude of a voltage charged in the third output terminal Nout3 by the duty ratio of the third converter switch Q3 and the fourth converter switch Q4 may be represented as Equation 11 below.

$$Vc4 = Vc2 \times D11 \qquad \text{[Equation 11]}$$

In Equation 11 above, D11 may be the turn-on duty ratio of the third converter switch Q3.

Figure 24:
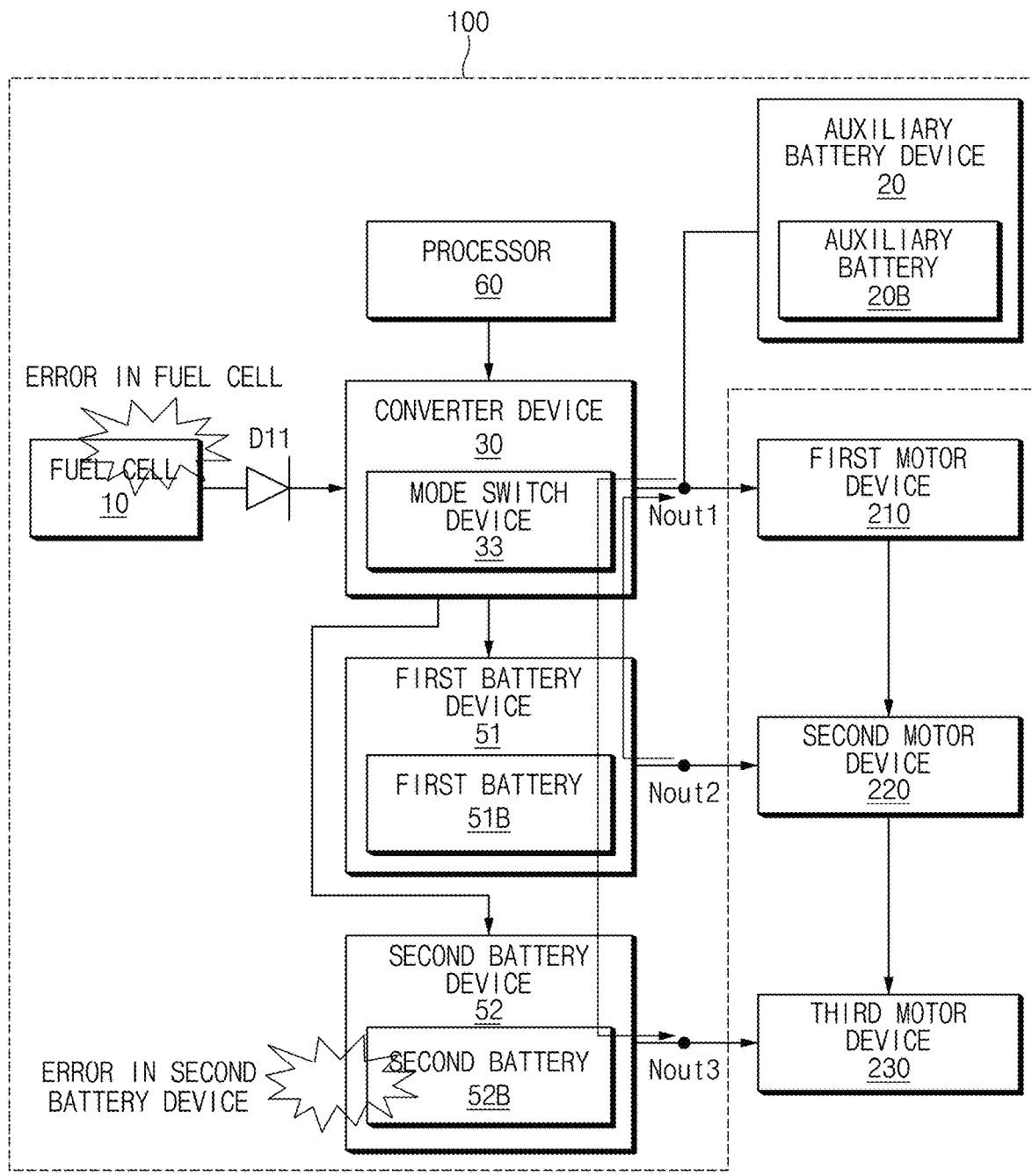
FIG. 24 is a drawing for schematically describing a power supply path of a fourth emergency mode.
Figure 25:
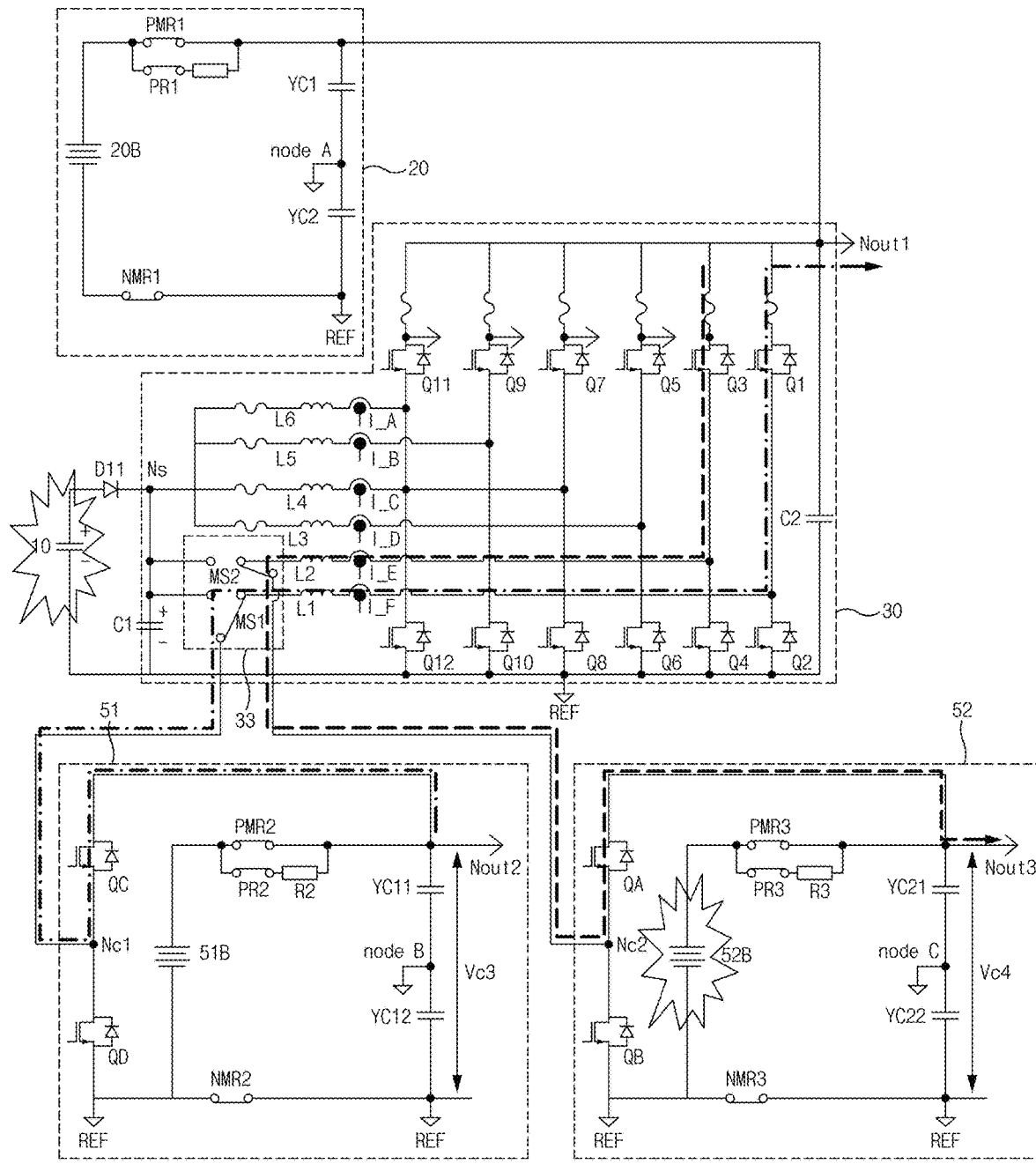
FIG. 25 is a drawing for describing an operation of a circuit diagram in a fourth emergency mode.

FIGS. 24 and 25 are diagrams for describing an operation of a fourth emergency mode. FIG. 24 is a diagram for schematically describing a power supply path of a fourth emergency mode. FIG. 25 is a diagram for describing an operation of a circuit diagram in a fourth emergency mode.

Referring to FIGS. 24 and 25, a processor 60 may charge a first output terminal Nout1 using a voltage of a second output terminal Nout2 in the fourth emergency mode.

To this end, the processor 60 may output a first control signal S1 as a low-level voltage VL. A first mode switch MS1 may connect a first inductor L1 with a node Nc1 between a first auxiliary converter switch QC and a second auxiliary converter switch QD based on the first control signal S1 of the low-level voltage VL. At the same time, the first inductor L1 and an output node Ns of a fuel cell 10 may be disconnected from each other by the first control signal S1 of the low-level voltage VL.

The processor 60 may compare a required voltage of the first output terminal Nout1 with a voltage of a first battery 51B.

If the required voltage of the first output terminal Nout1 is greater than the voltage of the first battery 51B, the processor 60 may keep the first auxiliary converter switch QC turned on and may keep the second auxiliary converter switch QD turned off. At the same time, the processor 60 may alternately turn on the first converter switch Q1 and the second converter switch Q2 and may boost and supply the voltage of the second output terminal Nout2 to the first output terminal Nout1.

The magnitude of a voltage charged in the first output terminal Nout1 by the duty ratio of the first converter switch Q1 and the second converter switch Q2 may be represented as Equation 4 above.

If the required voltage of the first output terminal Nout1 is less than the voltage of the first battery 51B, the processor 60 may keep the first converter switch Q1 turned on and may keep the second converter switch Q2 turned off. At the same time, the processor 60 may alternately turn on the first auxiliary converter switch QC and the second auxiliary converter switch QD and may supply the voltage of the second output terminal Nout2 to the first output terminal Nout1.

The magnitude of a voltage charged in the first output terminal Nout1 by the duty ratio of the first auxiliary converter switch QC and the second auxiliary converter switch QD may be represented as Equation 5 above.

The processor 60 may charge a third output terminal Nout3 using power of the first output terminal Nout1 charged with the power of the second output terminal Nout2.

To this end, the processor 60 may output the first control signal S1 as the low-level voltage VL. A second mode switch MS2 may connect a node Nc2 between a third auxiliary converter switch QA and a fourth auxiliary converter switch QB with a second inductor L2 based on the first control signal S1 of the low-level voltage VL. At the same time, the second inductor L2 and the output node Ns of the fuel cell 10 may be disconnected from each other by the first control signal S1 of the low-level voltage VL.

The processor 60 may compare a required voltage of the third output terminal Nout3 with a voltage of the first output terminal Nout1.

If the required voltage of the third output terminal Nout3 is greater than the voltage of the first output terminal Nout1, the processor 60 may keep a third converter switch Q3 turned on and may keep a fourth converter switch Q4 turned off. At the same time, the processor 60 may alternately turn on the third auxiliary converter switch QA and the fourth auxiliary converter switch QB and may boost and supply the voltage of the first output terminal Nout1 to the third output terminal Nout3.

The magnitude of a voltage charged in the third output terminal Nout3 by the duty ratio of the third auxiliary converter switch QA and the fourth auxiliary converter switch QB may be represented as Equation 10 above.

If the required voltage of the third output terminal Nout3 is less than the voltage of the first output terminal Nout1, the processor 60 may keep the third auxiliary converter switch QA turned on and may keep the fourth auxiliary converter switch QB turned off. At the same time, the processor 60 may alternately turn on the third converter switch Q3 and the fourth converter switch Q4 and may supply the voltage of the first output terminal Nout1 to the third output terminal Nout3.

The magnitude of a voltage charged in the third output terminal Nout3 by the duty ratio of the third converter switch Q3 and the fourth converter switch Q4 may be represented as Equation 11 above.

FIGS. 24 and 25 illustrate that the errors in the fuel cell 10 and the second battery device 52 are detected. But the emergency mode may operate even when the errors in the fuel cell 10 and the first battery device 51 are detected, and the power may be supplied from the second battery device 52 to the converter device 30 (e.g., the first output terminal Nout1), and from the converter device 30 to the first battery device 51 in a similar way.

If the error in the fuel cell 10 and the first battery device 51 is detected, the processor 60 may control operations of the third converter switch Q3, the fourth converter switch Q4, the third auxiliary converter switch QA, and the fourth auxiliary converter switch QB to charge the first output terminal Nout1 based on power of the third output terminal Nout3.

If the error in the fuel cell 10 and the first battery device 51 is detected, the processor 60 may control operations of the first converter switch Q1, the second converter switch Q2, the first auxiliary converter switch QC, and the second auxiliary converter switch QD to charge the second output terminal Nout2 based on power of the first output terminal Nout1.

According to an aspect of the present disclosure, a power supply system of an aircraft may include a fuel cell that generates electrical energy, a converter device including a mode switch device that supplies power to a first motor device through a first output terminal and switches a connection between an output node of the fuel cell and the first output terminal, a first battery device that supplies a voltage from a first battery to a second motor device through a second output terminal and connects the second output terminal with the first output terminal under control of the mode switch device, and a processor that controls the mode switch device to enter an emergency mode when detecting an error in the converter device or the first battery device and connect the first output terminal with the second output terminal.

The converter device may further include a first converter switch and a second converter switch connected in series with each other between the first output terminal and a ground and a first inductor connected with a node between the first converter switch and the second converter switch.

The first battery device may include the first battery having a first electrode connected with the second output terminal and a second electrode connected with the ground and a first auxiliary converter switch and a second auxiliary converter switch connected in series with each other between the second output terminal and the ground. A node Nc1 between the first auxiliary converter switch and the second auxiliary converter switch may be connected with the mode switch device.

The processor may control the mode switch device, such that the first inductor and the node Nc1 are connected with each other, in the emergency mode.

The processor may enter a first emergency mode when an error in the fuel cell is generated and may calculate a required voltage of the first output terminal and may control operations of the first auxiliary converter switch, the second auxiliary converter switch, the first converter switch, and the second converter switch, based on a magnitude of the required voltage of the first output terminal.

The processor may keep the first auxiliary converter switch turned on and may keep the second auxiliary converter switch turned off, when the required voltage of the first output terminal is greater than the voltage of the first battery in the first emergency mode, and may adjust a duty ratio of the first converter switch and the second converter switch depending on the required voltage of the first output terminal.

The processor may keep the first converter switch turned on and may keep the second converter switch turned off, when the required voltage of the first output terminal is less than the voltage of the first battery in the first emergency mode, and may adjust a duty ratio of the first auxiliary converter switch and the second auxiliary converter switch depending on the required voltage of the first output terminal.

The processor may enter a second emergency mode when the error in the first battery device is generated and may calculate a required voltage of the second output terminal and may control operations of the first auxiliary converter switch, the second auxiliary converter switch, the first converter switch, and the second converter switch, based on a magnitude of the required voltage of the second output terminal.

The processor may keep the first converter switch turned on and may keep the second converter switch turned off, when the required voltage of the second output terminal is greater than a voltage of the fuel cell in the second emergency mode, and may adjust a duty ratio of the first auxiliary converter switch and the second auxiliary converter switch depending on the required voltage of the second output terminal.

The processor may keep the first auxiliary converter switch turned on and may keep the second auxiliary converter switch turned off, when the required voltage of the second output terminal is less than a voltage of the fuel cell in the second emergency mode, and may adjust a duty ratio of the first converter switch and the second converter switch depending on the required voltage of the second output terminal.

The power supply system may further include a second battery device that supplies a voltage to a third motor device through a third output terminal connected with a first electrode of a second battery. The processor may connect the third output terminal with the first output terminal through the mode switch device in the emergency mode.

The converter device may further include a third converter switch and a fourth converter switch connected in series with each other between the first output terminal and the ground and a second inductor connected with a fourth node between the third converter switch and the second converter switch. The second battery device may include a third auxiliary converter switch and a fourth auxiliary converter switch connected in series with each other between the third output terminal and the ground. The processor may connect a node Nc2 between the third auxiliary converter switch and the fourth auxiliary converter switch with the second inductor, in the emergency mode.

The processor may enter a third emergency mode when an error in the fuel cell and the second battery device is generated, may control operations of the first auxiliary converter switch, the second auxiliary converter switch, the first converter switch, and the second converter switch, based on a magnitude of a required voltage of the first output terminal, and may control operations of the third converter switch, the fourth converter switch, the third auxiliary converter switch, and the fourth auxiliary converter switch, based on a magnitude of a required voltage of the third output terminal.

According to another aspect of the present disclosure, a control method of a power supply system of an aircraft may include connecting an output node of a fuel cell with a first output terminal through a converter device including a mode switch device and supplying power of the fuel cell to the first output terminal connected with a first motor device, supplying power of a first battery included in a first battery device to a second output terminal connected with a second motor device, and controlling the mode switch device to enter an emergency mode when detecting an error in the fuel cell or the first battery device and connecting the first output terminal with the second output terminal.

The supplying of the power of the fuel cell to the first output terminal connected with the first motor device may include connecting a first inductor connected with a node between a first converter switch and a second converter switch connected in series with each other between the first output terminal and a ground with the output node of the fuel cell.

The controlling of the mode switch device to connect the first output terminal with the second output terminal may include connecting a node Nc1 between a first auxiliary converter switch and a second auxiliary converter switch connected in series with each other between a first electrode of the first battery and a second electrode of the first battery with the first inductor.

The controlling of the mode switch device to connect the first output terminal with the second output terminal may include entering a first emergency mode when the error in the fuel cell is generated and calculating a required voltage of the first output terminal, keeping the first auxiliary converter switch turned on and keeping the second auxiliary converter switch turned off, when the required voltage of the first output terminal is greater than a voltage of the first battery, and adjusting a duty ratio of the first converter switch and the second converter switch depending on the required voltage of the first output terminal.

The controlling of the mode switch device to connect the first output terminal with the second output terminal may include keeping the first converter switch turned on and keeping the second converter switch turned off, when the required voltage of the first output terminal is less than a voltage of the first battery in a first emergency mode, and adjusting a duty ratio of the first auxiliary converter switch and the second auxiliary converter switch depending on a required voltage of the first output terminal.

The controlling of the mode switch device to connect the first output terminal with the second output terminal may include entering a second emergency mode in which an error in the battery device is generated and calculating a required voltage of the second output terminal, keeping the first converter switch turned on and keeping the second converter switch turned off, when the required voltage of the first output terminal is less than a voltage of the fuel cell in the second emergency mode, and adjusting a duty ratio of the first auxiliary converter switch and the second auxiliary converter switch depending on the required voltage of the second output terminal.

The controlling of the mode switch device to connect the first output terminal with the second output terminal may include keeping the first auxiliary converter switch turned on and keeping the second auxiliary converter switch turned off, when a required voltage of the second output terminal is less than a voltage of the fuel cell in a second emergency mode, and adjusting a duty ratio of the first converter switch and the second converter switch depending on the required voltage of the second output terminal.

The control method may further include supplying power of a second battery included in a second battery device to a third output terminal connected with a third motor device and controlling the mode switch device to enter the emergency mode when detecting an error in the second battery device and connecting the first output terminal with the third output terminal.

The power supply system and the control method thereof according to one or more aspects of the present disclosure may use a fuel cell and a battery together to drive a plurality of propellers, thus making the take-off of the aircraft easier while reducing a weight compared to using the fuel cell.

The power supply system and the control method thereof according to one or more aspects of the present disclosure may charge the battery using a fuel cell in a duration where the power of the aircraft is not large, thus further increasing a cruising distance even while reducing the capacity of the battery.

The power supply system and the control method thereof according to one or more aspects of the present disclosure may control a connection between output terminals connected with a motor device through a mode switch device when an error occurs in some power supply sources, thus disabling the power supply source in failure and using other power supply source(s) to supply power to the motor device.

In addition, various effects ascertained directly or indirectly through the present disclosure may be provided.

Hereinabove, although the present disclosure has been described with reference to some examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the illustrated examples. The scope of the present disclosure should be construed on the basis of the accompanying claims, and all the technical ideas within the scope equivalent to the claims should be included in the scope of the present disclosure.

What is claimed is:

1. A power supply system of an aircraft, the power supply system comprising:
   a fuel cell configured to generate electrical energy;
   a converter device configured to supply power to a first motor device via a first output terminal, wherein the converter device comprises a mode switch device configured to control a connection between an output node of the fuel cell and a first inductor;
   a first battery device configured to supply a voltage from a first battery to a second motor device via a second output terminal of the first battery device, wherein the mode switch device is configured to control a connection between the first battery device and the first inductor; and
   a processor configured to:
      operate in an emergency mode, based on a detection of an error associated with the converter device or an error associated with the first battery device, and
      control the mode switch device to connect the first inductor with the first battery device,
   wherein the converter device further comprises:
      a first converter switch and a second converter switch connected in series with each other between the first output terminal and a reference node; and
      the first inductor,
   wherein a first end of the first inductor is connected to a node between the first converter switch and the second converter switch,
   wherein the mode switch device is configured to selectively connect a second end of the first inductor with the output node of the fuel cell or the first battery device,
   wherein the processor is further configured to control the mode switch device, such that the first inductor and the second output terminal are electrically connected, in the emergency mode, by connecting the second end of the first inductor with the first battery device.

2. The power supply system of claim 1, wherein the first battery device comprises:
   the first battery having a first electrode coupled to the second output terminal and a second electrode coupled to the reference node; and
   a first auxiliary converter switch and a second auxiliary converter switch connected in series with each other between the second output terminal and the reference node,
   wherein a node between the first auxiliary converter switch and the second auxiliary converter switch is connected to the mode switch device, such that the mode switch device controls a connection between the second end, of the first inductor, and the node between the first auxiliary converter switch and the second auxiliary converter switch.

3. The power supply system of claim 2, wherein the processor is configured to control the mode switch device, such that the first inductor and the node between the first auxiliary converter switch and the second auxiliary converter switch are connected with each other, in the emergency mode.

4. The power supply system of claim 3, wherein the processor is configured to:
   enter into a first emergency mode based on an error associated with the fuel cell,
   calculate a required voltage between the first output terminal and the reference node, and
   control, based on a magnitude of the required voltage between the first output terminal and the reference node, operations of the first auxiliary converter switch, the second auxiliary converter switch, the first converter switch, and the second converter switch.

5. The power supply system of claim 4, wherein the processor is configured to:
   keep the first auxiliary converter switch turned on and keep the second auxiliary converter switch turned off, based on a determination that the required voltage is greater than a voltage of the first battery in the first emergency mode, and
   adjust, based on the required voltage, a duty ratio of the first converter switch and the second converter switch.

6. The power supply system of claim 4, wherein the processor is configured to:
   keep the first converter switch turned on and keep the second converter switch turned off, based on a determination that the required voltage is less than a voltage of the first battery in the first emergency mode, and
   adjust, based on the required voltage, a duty ratio of the first auxiliary converter switch and the second auxiliary converter switch.

7. The power supply system of claim 3, wherein the processor is configured to:
   enter into a second emergency mode based on the error associated with the first battery device,
   calculate a required voltage between the second output terminal and the reference node, and
   control, based on a magnitude of the required voltage between the second output terminal and the reference node, operations of the first auxiliary converter switch, the second auxiliary converter switch, the first converter switch, and the second converter switch.

8. The power supply system of claim 7, wherein the processor is configured to:
   keep the first converter switch turned on and keep the second converter switch turned off, based on a determination that the required voltage is greater than a voltage between the first output terminal and the reference node in the second emergency mode, and
   adjust, based on the required voltage, a duty ratio of the first auxiliary converter switch and the second auxiliary converter switch.

9. The power supply system of claim 7, wherein the processor is configured to:
   keep the first auxiliary converter switch turned on and keep the second auxiliary converter switch turned off, based on a determination that the required voltage is less than a voltage between the first output terminal and the reference node in the second emergency mode, and
   adjust, based on the required voltage, a duty ratio of the first converter switch and the second converter switch.

10. The power supply system of claim 2, further comprising:
    a second battery device configured to supply a voltage to a third motor device via a third output terminal connected with a first electrode of a second battery,
    wherein the second end of the first inductor is a first end of the mode switch device, and
    wherein the processor is configured to connect the second battery device to a second end of the mode switch device in the emergency mode.

11. The power supply system of claim 10, wherein the converter device further comprises:
a third converter switch and a fourth converter switch connected in series with each other between the first output terminal and the reference node; and
a second inductor connected between the second end, of the mode switch device, and a node between the third converter switch and the fourth converter switch,
wherein the second battery device comprises:
a third auxiliary converter switch and a fourth auxiliary converter switch connected in series with each other between the third output terminal and the reference node, and
wherein, in the emergency mode, the processor is configured to connect a node between the third auxiliary converter switch and the fourth auxiliary converter switch to the second end of the mode switch device.

12. The power supply system of claim 11, wherein the processor is configured to:
enter into a third emergency mode based on a detection of an error associated with the fuel cell and an error associated with the second battery device,
control, based on a magnitude of a required voltage between the first output terminal and the reference node, operations of the first auxiliary converter switch, the second auxiliary converter switch, the first converter switch, and the second converter switch, and
control, based on a magnitude of a required voltage between the third output terminal and the reference node, operations of the third converter switch, the fourth converter switch, the third auxiliary converter switch, and the fourth auxiliary converter switch.

13. A control method of a power supply system of an aircraft, the control method comprising:
supplying power from a fuel cell to a first motor device via a first output terminal of a converter device of the power supply system;
supplying power from a first battery of a first battery device to a second motor device via a second output terminal of the first battery device; and
based on a detection of an error associated with the fuel cell or an error associated with the first battery device, controlling a mode switch device to enter into an emergency mode and to connect the first battery device to a first end of the mode switch device,
wherein the supplying of power from the fuel cell to the first motor device comprises connecting an output node of the fuel cell and a first inductor, wherein a first end of the first inductor is connected to a node between a first converter switch and a second converter switch connected in series with each other between the first output terminal and a reference node, and wherein a second end of the first inductor is the first end of the mode switch device,
wherein the controlling the mode switch device to enter into an emergency mode comprises electrically connecting the second end of the first inductor and the second output terminal, in the emergency mode, by connecting the second end of the first inductor with the first battery device.

14. The control method of claim 13, wherein the controlling of the mode switch device to connect the first battery device to the first end of the mode switch device comprises:
connecting the second end of the first inductor to a node between a first auxiliary converter switch and a second auxiliary converter switch connected in series with each other between a first electrode of the first battery and a second electrode of the first battery.

15. The control method of claim 14, wherein the controlling of the mode switch device to connect the first battery device to the first end of the mode switch device comprises:
entering into a first emergency mode based on a detection of the error associated with the fuel cell,
calculating a required voltage between the first output terminal and the reference node;
keeping the first auxiliary converter switch turned on and keeping the second auxiliary converter switch turned off, based on a determination that the required voltage is greater than a voltage of the first battery; and
adjusting, based on the required voltage, a duty ratio of the first converter switch and the second converter switch.

16. The control method of claim 14, wherein the controlling of the mode switch device to connect the first battery device to the first end of the mode switch device comprises:
keeping the first converter switch turned on and keeping the second converter switch turned off, based on a determination that a required voltage between the first output terminal and the reference node is less than a voltage of the first battery in a first emergency mode; and
adjusting, based on the required voltage, a duty ratio of the first auxiliary converter switch and the second auxiliary converter switch.

17. The control method of claim 14, wherein the controlling of the mode switch device to connect the first battery device to the first end of the mode switch device comprises:
entering into a second emergency mode in which an error associated with the first battery device occurs;
calculating a required voltage between the second output terminal and the reference node;
keeping the first converter switch turned on and keeping the second converter switch turned off, based on a determination that the required voltage is less than a voltage between the first output terminal and the reference node in the second emergency mode; and
adjusting, based on the required voltage, a duty ratio of the first auxiliary converter switch and the second auxiliary converter switch.

18. The control method of claim 14, wherein the controlling of the mode switch device to connect the first battery device to the first end of the mode switch device comprises:
keeping the first auxiliary converter switch turned on and keeping the second auxiliary converter switch turned off, based on a determination that a required voltage between the second output terminal and the reference node is less than a voltage between the first output terminal and the reference node in a second emergency mode; and
adjusting, based on the required voltage, a duty ratio of the first converter switch and the second converter switch.

19. A power supply system of an aircraft, the power supply system comprising:
a fuel cell configured to generate electrical energy;
a converter device configured to supply power to a first motor device via a first output terminal, wherein the converter device comprises a mode switch device configured to control a connection between an output node of the fuel cell and a first end of the mode switch device;
a first battery device configured to supply a voltage from a first battery to a second motor device via a second output terminal, wherein the mode switch device is configured to control a connection between the first battery device and the first end of the mode switch device; and a processor configured to:

operate in an emergency mode, based on a detection of an error associated with the converter device or an error associated with the first battery device, and control the mode switch device to connect the first end of the mode switch device with the first battery device, wherein the first battery device comprises:

the first battery having a first electrode coupled to the second output terminal and a second electrode coupled to a reference node; and a first auxiliary converter switch and a second auxiliary converter switch connected in series with each other between the second output terminal and the reference node, and wherein a node between the first auxiliary converter switch and the second auxiliary converter switch is connected to the mode switch device, such that the mode switch device controls a connection between the first end, of the mode switch device, and the node between the first auxiliary converter switch and the second auxiliary converter switch.

* * * * *